(12) United States Patent
Berliner et al.

(10) Patent No.: US 11,509,380 B2
(45) Date of Patent: Nov. 22, 2022

(54) BEAM FAILURE REPORTING USING DATA FIELD IN UPLINK CONTROL CHANNEL

(71) Applicant: QUALCOMM Incorporated, San Diego, CA (US)

(72) Inventors: Ran Berliner, Kfar-Aviv (IL); Shay Landis, Hod Hasharon (IL); Yehonatan Dallal, Kfar Saba (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 17/118,490

(22) Filed: Dec. 10, 2020

(65) Prior Publication Data

US 2022/0190900 A1    Jun. 16, 2022

(51) Int. Cl.
| | |
|---|---|
| *H04B 7/06* | (2006.01) |
| *H04W 72/04* | (2009.01) |
| *H04W 76/19* | (2018.01) |
| *H04W 80/02* | (2009.01) |
| *H04L 5/00* | (2006.01) |
| *H04B 7/08* | (2006.01) |

(52) U.S. Cl.
CPC ........ *H04B 7/0695* (2013.01); *H04W 72/046* (2013.01); *H04W 72/0413* (2013.01); *H04W 76/19* (2018.02); *H04W 80/02* (2013.01)

(58) Field of Classification Search
CPC ............ H04B 7/0695; H04W 72/0413; H04W 72/046; H04W 76/19; H04W 80/02
See application file for complete search history.

(56) References Cited

U.S. PATENT DOCUMENTS

| 10,812,125 | B1* | 10/2020 | Badic | H04B 7/0408 |
| 2020/0177424 | A1* | 6/2020 | Noh | H04L 5/0055 |
| 2020/0373990 | A1* | 11/2020 | Da Silva | H04W 16/28 |
| 2021/0036757 | A1* | 2/2021 | Yu | H04L 1/1861 |
| 2021/0058998 | A1* | 2/2021 | Yuan | H04W 24/08 |
| 2021/0409094 | A1* | 12/2021 | Yuan | H04W 24/08 |

FOREIGN PATENT DOCUMENTS

| WO | WO-2019191960 A1 | 10/2019 |
| WO | WO-2020168238 A1 | 8/2020 |

OTHER PUBLICATIONS

International Search Report and Written Opinion—PCT/US2021/072090—ISA/EPO—dated Mar. 1, 2022.

\* cited by examiner

*Primary Examiner* — Harry H Kim
(74) *Attorney, Agent, or Firm* — Holland & Hart, LLP

(57) ABSTRACT

Methods, systems, and devices for wireless communications are described. Some wireless communications networks may support carrier aggregation such that a user equipment (UE) may operate on both a primary cell using a first frequency range and a secondary cell using a second frequency range. In some cases, a beam failure associated with one or more beams of the secondary cell may be identified by the UE, and a beam failure recovery procedure may be triggered. The UE may send a beam failure recovery request message in an uplink data field of a physical uplink control channel (PUCCH) message to a base station of the primary cell. In response to the beam failure recovery request message, the base station of the primary cell may transmit a response to the UE which includes beam failure mitigation information.

30 Claims, 16 Drawing Sheets

BEAM FAILURE REPORTING USING DATA FIELD IN UPLINK CONTROL CHANNEL

FIELD OF TECHNOLOGY

The following relates to wireless communications, including beam failure reporting using data field in uplink control channel.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems (e.g., 5G NR) systems, a UE may be configured for communications using multiple service cells to increase data throughput, reliability, and system capacity. Conventional techniques for reporting beam failure in such systems, however, may be deficient.

SUMMARY

The described techniques relate to improved methods, systems, devices, and apparatuses that support beam failure reporting using data field in uplink control channel. Generally, the described techniques provide for beam failure reporting and mitigation. Some wireless communications networks may support carrier aggregation such that a user equipment (UE) may operate on a number of serving cells in accordance with the carrier aggregation architecture. For example, a UE may operate on a primary cell using a first frequency range (e.g., frequency range 1 (FR1)), and a secondary cell using a second frequency range (e.g., frequency range 2 (FR2). In some examples, however, beam failure may occur due to blockage or signaling interference, thus causing the signal quality of a communications beam to drop below a threshold signal quality.

In some examples, beam failure associated with one or more beams of the secondary cell may be identified by the UE, and a beam failure recovery procedure may be triggered. In one example, of a beam failure recovery procedure, the UE may send a beam failure recovery request message (e.g., a beam failure recovery request medium access control-control element (MAC-CE)) in an uplink data field of a physical uplink control channel (PUCCH) message to a base station of the primary cell. The uplink data field of the PUCCH may be formatted to convey uplink payload data, while other portions of the PUCCH may be formatted to convey uplink control information (e.g., such as hybrid automatic repeat request (HARQ) information, channel status information (CSI), scheduling requests, etc.). The base station of the primary cell may receive the beam failure recovery request MAC-CE, and may transmit a response to the UE which includes beam failure mitigation information.

A method for wireless communications at a user equipment (UE) is described. The method may include identifying a beam failure event of one or more beams associated with a secondary cell of the UE, transmitting, on a primary cell of the UE, a beam failure recovery request in an uplink data field of a physical uplink control channel message, where the uplink data field is configured to convey uplink payload data, and receiving, on the primary cell, a beam failure recovery response based on transmitting the beam failure recovery request.

An apparatus for wireless communications at a UE is described. The apparatus may include a processor, memory in electronic communication with the processor, and instructions stored in the memory. The instructions may be executable by the processor to cause the apparatus to identify a beam failure event of one or more beams associated with a secondary cell of the UE, transmit, on a primary cell of the UE, a beam failure recovery request in an uplink data field of a physical uplink control channel message, where the uplink data field is configured to convey uplink payload data, and receive, on the primary cell, a beam failure recovery response based on transmitting the beam failure recovery request.

Another apparatus for wireless communications at a UE is described. The apparatus may include means for identifying a beam failure event of one or more beams associated with a secondary cell of the UE, means for transmitting, on a primary cell of the UE, a beam failure recovery request in an uplink data field of a physical uplink control channel message, where the uplink data field is configured to convey uplink payload data, and means for receiving, on the primary cell, a beam failure recovery response based on transmitting the beam failure recovery request.

A non-transitory computer-readable medium storing code for wireless communications at a UE is described. The code may include instructions executable by a processor to identify a beam failure event of one or more beams associated with a secondary cell of the UE, transmit, on a primary cell of the UE, a beam failure recovery request in an uplink data field of a physical uplink control channel message, where the uplink data field is configured to convey uplink payload data, and receive, on the primary cell, a beam failure recovery response based on transmitting the beam failure recovery request.

In some examples of the method, apparatuses, and non-transitory computer-readable medium described herein, an occasion for transmitting the physical uplink control channel message occurs before an occasion for transmitting a link recovery request associated with the beam failure event.

In some examples of the method, apparatuses, and non-transitory computer-readable medium described herein, the occasion for transmitting the physical uplink control channel message may be associated with a first uplink resource and the occasion for transmitting the link recovery request may be associated with a second uplink resource different from the first uplink resource.

In some examples of the method, apparatuses, and non-transitory computer-readable medium described herein, the beam failure recovery request includes a medium access control-control element conveying beam failure information associated with the one or more beams on the secondary cell.

In some examples of the method, apparatuses, and non-transitory computer-readable medium described herein, the beam failure information includes an index of the secondary cell, a number of candidate beams to replace the one or more beams, or both.

In some examples of the method, apparatuses, and non-transitory computer-readable medium described herein, the physical uplink control channel message includes one or more additional fields configured to convey uplink control information, the uplink control information different from the uplink payload data.

In some examples of the method, apparatuses, and non-transitory computer-readable medium described herein, the beam failure recovery response includes a physical downlink control channel message and indicates of a set of candidate beams to replace the one or more beams associated with the beam failure event.

Some examples of the method, apparatuses, and non-transitory computer-readable medium described herein may further include operations, features, means, or instructions for transmitting the beam failure recovery request in the uplink data field of the physical uplink control channel message based on a payload size of the beam failure recovery request.

In some examples of the method, apparatuses, and non-transitory computer-readable medium described herein, the uplink data field may be configured based on a format of the physical uplink control channel message.

A method for wireless communications at a base station associated with a primary cell is described. The method may include receiving, from a UE, a beam failure recovery request for one or more beams associated with a secondary cell of the UE, where the beam failure recovery request is formatted in an uplink data field of a physical uplink control channel message that is configured to convey uplink payload data and transmitting a beam failure recovery response based on receiving the beam failure recovery request.

An apparatus for wireless communications at a base station associated with a primary cell is described. The apparatus may include a processor, memory in electronic communication with the processor, and instructions stored in the memory. The instructions may be executable by the processor to cause the apparatus to receive, from a UE, a beam failure recovery request for one or more beams associated with a secondary cell of the UE, where the beam failure recovery request is formatted in an uplink data field of a physical uplink control channel message that is configured to convey uplink payload data and transmit a beam failure recovery response based on receiving the beam failure recovery request.

Another apparatus for wireless communications at a base station associated with a primary cell is described. The apparatus may include means for receiving, from a UE, a beam failure recovery request for one or more beams associated with a secondary cell of the UE, where the beam failure recovery request is formatted in an uplink data field of a physical uplink control channel message that is configured to convey uplink payload data and means for transmitting a beam failure recovery response based on receiving the beam failure recovery request.

A non-transitory computer-readable medium storing code for wireless communications at a base station associated with a primary cell is described. The code may include instructions executable by a processor to receive, from a UE, a beam failure recovery request for one or more beams associated with a secondary cell of the UE, where the beam failure recovery request is formatted in an uplink data field of a physical uplink control channel message that is configured to convey uplink payload data and transmit a beam failure recovery response based on receiving the beam failure recovery request.

In some examples of the method, apparatuses, and non-transitory computer-readable medium described herein, an occasion for receiving the physical uplink control channel message occurs before an occasion for receiving a link recovery request associated with the one or more beams.

Some examples of the method, apparatuses, and non-transitory computer-readable medium described herein may further include operations, features, means, or instructions for configuring a first uplink resource for the UE to transmit the physical uplink control channel message and a second uplink resource for the UE to transmit the link recovery request, where the first uplink resource may be different from the second uplink resource.

In some examples of the method, apparatuses, and non-transitory computer-readable medium described herein, the beam failure recovery request includes a medium access control-control element conveying beam failure information associated with the one or more beams on the secondary cell.

In some examples of the method, apparatuses, and non-transitory computer-readable medium described herein, the beam failure information includes an index of the secondary cell, a number of candidate beams to replace the one or more beams, or both.

In some examples of the method, apparatuses, and non-transitory computer-readable medium described herein, the physical uplink control channel message includes one or more additional fields configured to convey uplink control information, the uplink control information different from the uplink payload data.

Some examples of the method, apparatuses, and non-transitory computer-readable medium described herein may further include operations, features, means, or instructions for identifying one or more candidate beams to replace the one or more beams indicated in the beam failure recovery request, selecting a set of the one or more candidate beams based on a set of multiple beam metrics identified determined for the one or more candidate beams, and transmitting the beam failure recovery response including the set of the one or more candidate beams to replace the one or more beams.

Some examples of the method, apparatuses, and non-transitory computer-readable medium described herein may further include operations, features, means, or instructions for performing one or more measurements on the one or more candidate beams associated with the secondary cell based on the beam failure recovery request.

Some examples of the method, apparatuses, and non-transitory computer-readable medium described herein may further include operations, features, means, or instructions for receiving the beam failure recovery request in the uplink data field of the physical uplink control channel message based on a payload size of the beam failure recovery request.

In some examples of the method, apparatuses, and non-transitory computer-readable medium described herein, the uplink data field may be received in accordance with a format of the physical uplink control channel message.

DETAILED DESCRIPTION

Figure 1:
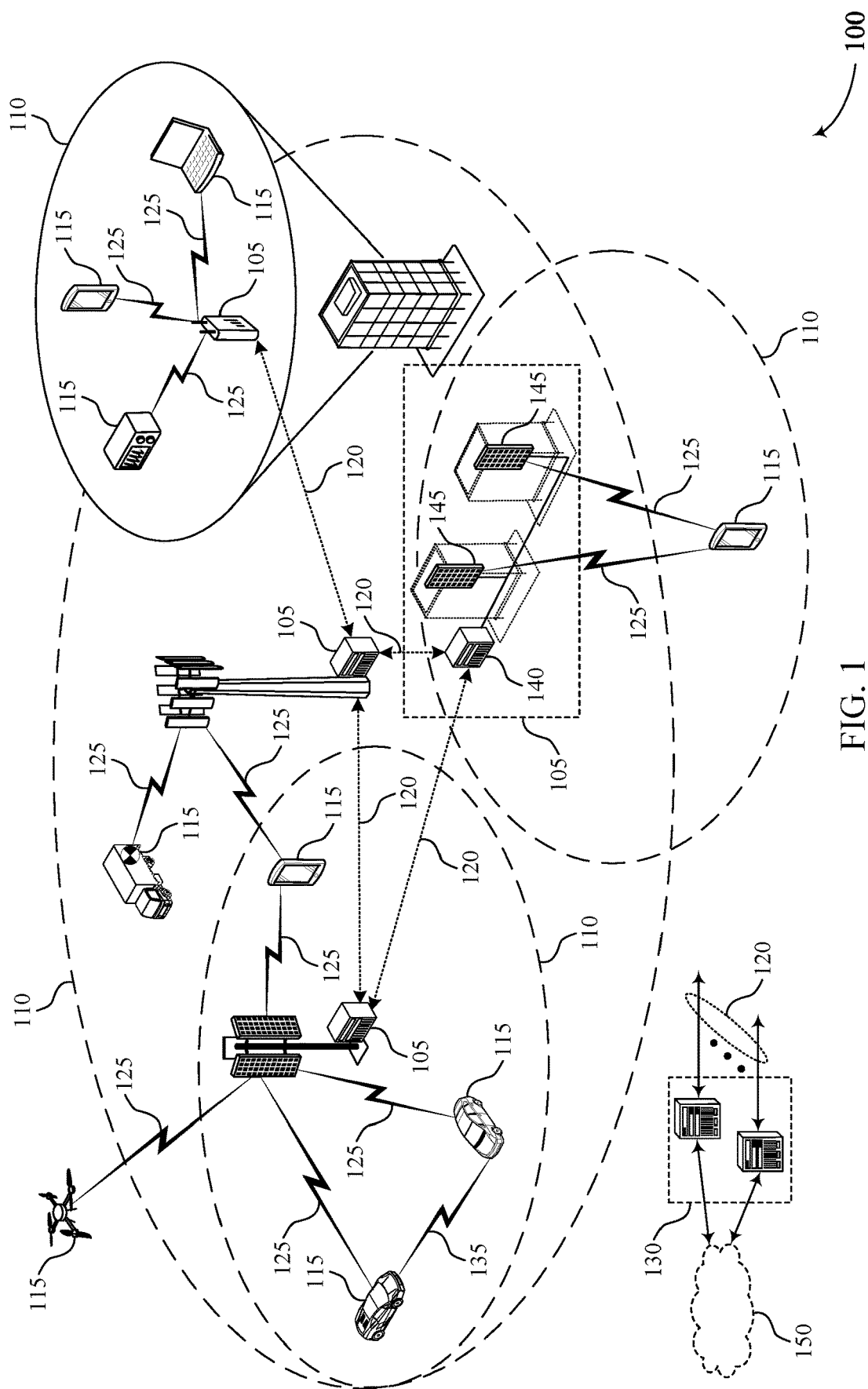
FIG. 1 illustrates an example of a wireless communications system that supports beam failure reporting using data field in uplink control channel in accordance with aspects of the present disclosure.

Some wireless communications networks may support carrier aggregation such that a user equipment (UE) may operate on a number of serving cells in accordance with the carrier aggregation architecture. For example, a UE may operate on (e.g., perform wireless communications) a primary cell using a first frequency range (e.g., frequency range 1 (FR1)), and a secondary cell using a second frequency range (e.g., frequency range 2 (FR2)). In some cases, signaling associated with FR2 on the secondary cell may support higher frequencies as compared to FR1, thus providing short range, high data rate communications between the UE and the secondary cell. In some examples, however, beam failure may occur between the UE and a network entity of the secondary cell due to blockage or signaling interference, thus causing the signal quality of a communications beam to drop below a threshold signal quality.

In some examples, beam failure associated with the secondary cell may be identified by the UE, and a beam failure recovery procedure may be triggered. In one example, of a beam failure recovery procedure, the UE may send a link recovery request (LRR) to the base station on the primary cell using an LRR PUCCH resource. In response to the LRR, the base station of the primary cell may allocate a physical uplink shared channel (PUSCH) grant that the UE may use to report the secondary cell index associated with the identified beam failure. The UE may transmit a beam failure recovery request message (e.g., a beam failure recovery MAC-CE) to the base station on the primary cell using the granted resources indicated by the uplink grant. In response to the beam failure recovery MAC-CE, the UE may receive a beam failure recovery response which includes additional beam failure mitigation information such as a replacement beam on the secondary cell.

Such procedures for beam failure reporting and beam failure recovery, however, may involve excessive signaling and may be time consuming, thus increasing signaling latency in the wireless system. For example, the latency of sending the LRR and receiving the uplink grant from the base station on the primary cell may in some cases be inefficient. Accordingly, the wireless communications network may implement a number of techniques to reduce signaling overhead and latency associated with such beam failure recovery procedures. For example, upon identifying the beam failure, the UE may send a message indicating a beam failure has occurred using resources in an uplink control message. For example, the UE may send the beam failure recovery MAC-CE in a short data field located in a PUCCH transmission. In such examples, the UE may opportunistically use the PUCCH occasion to send the beam failure recovery MAC-CE in cases where the PUCCH occasion occurs before an occasion to send the LRR. Thus, rather than waiting for a grant to send the data in a PUSCH, the UE may include the MAC-CE in a data field of the PUCCH which may effectively bypass the additional signaling and latency associated with the LRR and PUSCH.

Particular aspects of the subject matter described herein may be implemented to realize one or more advantages. The described techniques may support improvements in techniques for UE beam failure reporting and recovery. In some examples, the techniques may allow for reducing latency and the time of a beam failure recovery procedure, which may increase communications quality and efficiency. In addition, the techniques may increase the reliability of the UE operating on the primary cell and the secondary cell. For example, responsive beam failure recovery may increase the probability that data is effectively received by the UE. Further, the techniques described herein may allow for reduced signaling overhead, which may reduce congestion in a 5G NR network.

Aspects of the disclosure are initially described in the context of wireless communications systems such as those supporting carrier aggregation and beamformed communications. Aspects of the disclosure are further illustrated by and described with reference to apparatus diagrams, system diagrams, a process flow, and flowcharts that relate to beam failure reporting using data field in uplink control channel.

FIG. 1 illustrates an example of a wireless communications system 100 that supports beam failure reporting using data field in uplink control channel in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications networks may support carrier aggregation such that a UE 115 may operate on a number of serving cells 110 in accordance with the carrier aggregation architecture. For example, a UE may operate on a primary cell using a first frequency range (e.g., frequency range 1 (FR1)), and a secondary cell using a second frequency range (e.g., frequency range 2 (FR2)). In some examples, FR1 may correspond to radio frequency bands between 4.1 GHz to 7.125 GHz, and FR2 may correspond to radio frequency bands between 24.25 GHz and 52.6 GHz. In some examples, however, beam failure may occur due to blockage or signaling interference, thus causing the signal quality of a communications beam to drop below a threshold signal quality.

In some examples, beam failure associated with the secondary cell may be identified by the UE 115, and a beam failure recovery procedure may be triggered. In one example, of a beam failure recovery procedure, the UE may send a link recovery request (LRR) to a base station 105 on the primary cell using PUCCH resource. In response to the LRR, the base station 105 of the primary cell may allocate an uplink grant that the UE 115 may use to report the secondary cell index associated with the identified beam failure. The UE 115 may transmit a beam failure recovery request message (e.g., a beam failure recovery MAC-CE) to the base station 105 on the primary cell using the granted resources indicated by the uplink grant. In response to the beam failure recovery MAC-CE, the UE 115 may receive a beam failure recovery response.

Some procedures for beam failure reporting and beam failure recovery, however, may involve excessive signaling and may be time consuming, thus increasing signaling latency in the wireless system. Accordingly, the wireless communications network may implement a number of techniques to reduce signaling overhead and latency. For example, upon identifying the beam failure, the UE 115 may send the beam failure recovery MAC-CE in a short data field located in a PUCCH transmission. In such examples, the UE 115 may opportunistically use the PUCCH occasion to send the beam failure recovery MAC-CE in cases where the PUCCH occasion occurs before an occasion to send the LRR.

Figure 2:
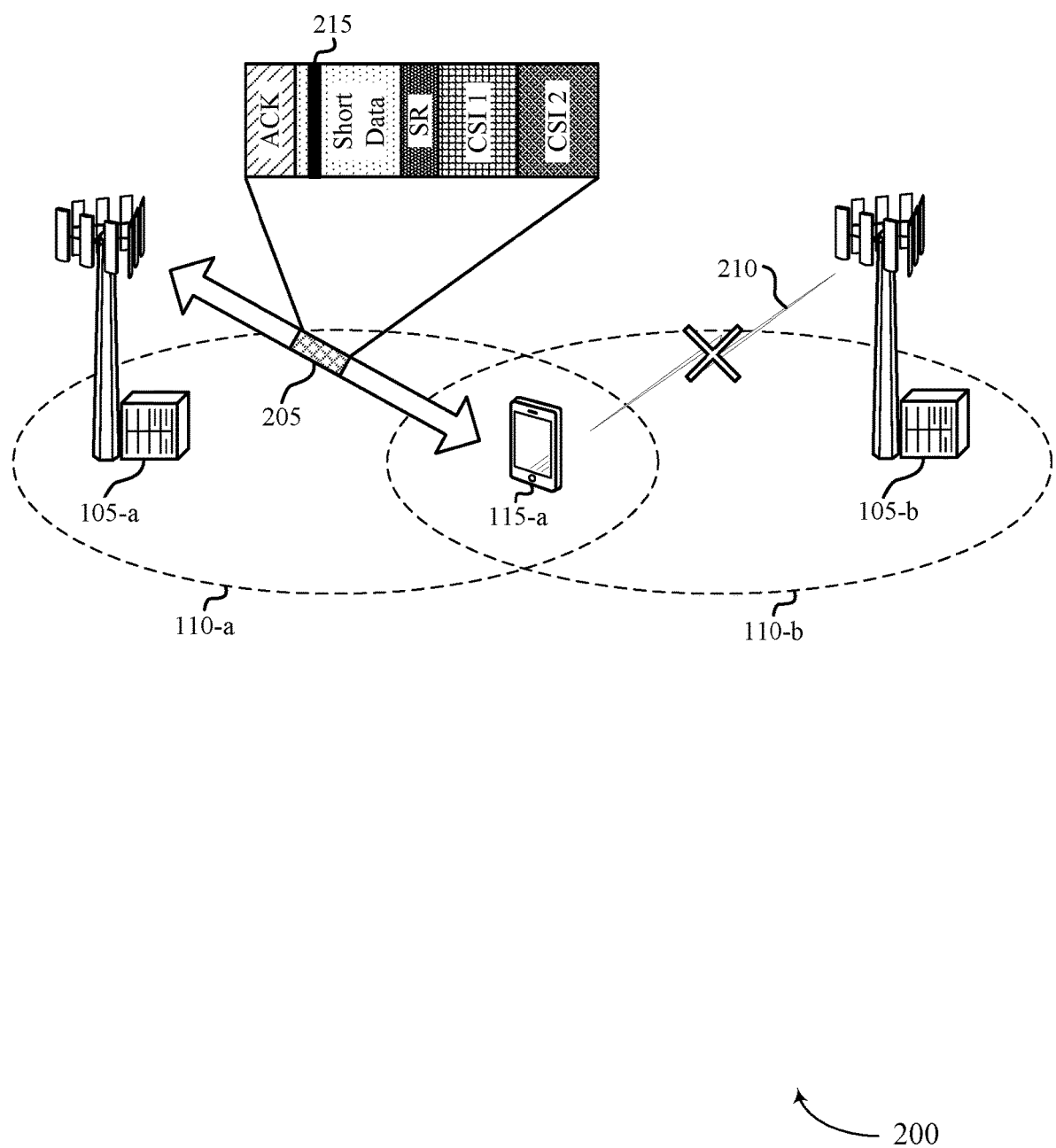
FIG. 2 illustrates an example of a wireless communications system that supports beam failure reporting using data field in uplink control channel in accordance with aspects of the present disclosure.

FIG. 2 illustrates an example of a wireless communications system 200 that supports beam failure reporting using data field in uplink control channel in accordance with aspects of the present disclosure. In some examples, wireless communications system 200 may implement aspects of wireless communication system 100. For example, the wireless communications system 200 may include base stations 105-*a* and 105-*b* and UE 115-*a* which may be examples of base stations 105 and UEs 115 as described with reference to FIG. 1. Base station 105-*a* may serve a primary cell or geographic coverage area (e.g., primary cell 110-*a*), and base station 105-*b* may serve a secondary cell or geographic coverage area (e.g., secondary cell 110-*b*). The primary cell 110-*a* and secondary cell 110-*b* may be examples of geographic coverage areas 110 described with reference to FIG. 1.

In some wireless communications systems, a UE may support signaling on different frequency ranges associated with a primary cell and secondary cell of the network. For example, a wireless communications system may be a 5G/NR system which enables a number of different frequency bands to be used by devices in the system. In wireless communications system 200, a primary cell 110-*a* may operate using a first frequency range (e.g., frequency range 1 (FR1)), and the base station 105-*a* may communicate with the UE 115-*a* using signaling within the FR1 frequency range (e.g., below 6 GHz). In addition, the UE 115-*a* may communicate with base station 105-*b* on the secondary cell 110-*b* using signaling within a second frequency range (e.g., frequency range 2 (FR2), supporting above 6 GHz frequencies). By using both FR1 and FR2 based signaling, the wireless communications network may support carrier aggregation to enable increased bandwidth for high speed data transfers and low latency communications.

In some cases, signaling associated with FR2 on the secondary cell 110-*b* may support higher frequencies as compared to FR1, thus providing short range, high data rate communications between the UE 115-*a* and the base station 105-*a*. In some examples, however, such high frequency communications may be associated with higher beam failure rates. In some cases, a beam failure event may occur between the UE 115-*a* and the base station 105-*a* on the secondary cell. For example, the communications beam 210 may be subject to blockage or signaling interference, thus causing the signal quality of communications beam 210 to drop below a threshold signal quality. In some examples, the base station 105-*a* may identify the beam failure event using periodic CSI-RS resources or SSBs used for radio link monitoring, in which the bases station 105-*a* may assess an out-of-sync threshold or a block error rate (BLER) threshold to identify whether the signal quality of communications beam 210 has been compromised.

In some other cases, the beam failure event may be identified by the UE 115-*a*, for example, the UE 115-*a* may identify a reduced signal strength of the signal 210 by measuring various beam quality metrics (e.g., SINR, RSRP, RSRQ) to determine the beam failure event, or the UE 115-*a* may be configured to measure a beam failure detection references signal based on a periodic 1-port CSI-RS or a received synchronization signal block (SSB) (e.g., configured explicitly by RRC signaling, or implicitly by a PDCCH TCI state). In some other examples, the beam failure event may be identified when a number of consecutive beam failure instances surpass a threshold.

In such cases where the UE 115-*a* identifies the beam failure on the secondary cell 110-*b* (e.g., the UE 115-*a* identifies that all or some threshold number of beams have failed on secondary cell 110-*b*), the UE 115-*a* may send a link recovery request (LRR) to the base station 105-*a* on the primary cell 110-*a* using an uplink control resource such as a PUCCH resource. In some examples, the LRR may be configured as a scheduling request (SR) formatted for a PUCCH (e.g., using PUCCH format 0, 1, etc.). In some examples, the UE 115-*a* may determine to send the LRR to the primary cell 110-*a* rather than performing a random access channel (RACH) procedure on the secondary cell 110-*b*. For example, the UE 115-*a* may already have an established connection on the primary cell 110-*a*, and sending the LRR to the primary cell 110-*a* and having the primary cell 110-*a* communicate with the secondary cell 110-*b* (e.g., to obtain new beam information) may be faster or more efficient than having the UE 115-*a* re-establish a connection with the secondary cell 110-*a* through the RACH procedure.

In response to the LRR, the base station 105-*a* may allocate an uplink grant that the UE 115-*a* may use to report information about the beam failure on the secondary cell 110-*a* (e.g., the secondary cell index associated with the identified beam failure). For example, the uplink grant may be an uplink grant including a cell radio network temporary identifier (C-RNTI) or a modulation coding scheme C-RNTI (MCS-C-RNTI), which the UE 115-*a* may use to report the cell index associated with the failed beam. The UE 115-*a* may transmit a beam failure recovery message to the base station 105-*a* using the resources (e.g., PUSCH resources) indicated by the uplink grant. In some examples, the beam failure recovery message may be a beam failure recovery MAC-CE, which includes the cell index of the secondary cell 110-*b*. In some cases, the beam failure recovery MAC-CE may include one or more potential new candidate beams on the secondary cell 110-*b* that the UE 115-*a* may identify to replace the failed beam 210. In response to the MAC-CE, the UE 115-*a* may receive a beam failure recovery response from the base station 105-*a*, which includes an additional uplink grant which schedules a new transmission for the same HARQ process as the PUSCH carrying the MAC-CE. In some examples, the base station 105-*a* may conduct additional beam training to determine a replacement beam (e.g., a beam with highest communications quality or signal strength) for the UE 115-*a* to use for communications on the secondary cell 110-*b*.

However, such procedures for beam failure reporting and beam failure recovery may have high signaling overhead and may be time consuming, thus increasing signaling latency in the wireless communications system 200. For example, the latency of the beam failure recovery transmission may include the time elapsed between declaring beam failure (e.g., the detection of the beam failure event at the UE 115-*a*) and transmitting the beam failure recovery MAC-CE. This latency includes the elapsed time in which the UE sends the LRR (e.g., up to 40 ms latency), receives the uplink grant from the base station 105-*a* (e.g., up to 10 ms latency), and transmits the beam failure recovery MAC-CE (e.g., up to 0.5 ms latency between receiving the uplink grant and transmitting the MAC-CE). Such excess signaling may reduce communications efficiency for high data rate and low latency communications conducted on the secondary cell 110-*b*, while increasing signaling congestion in the wireless communications system 200. Accordingly, the wireless communications system 200 may implement a number of techniques to reduce signaling overhead and latency associated with such beam failure recovery procedures.

In some examples, the UE 115-*a* may use a field in a control message (e.g., an uplink control message) that is formatted or otherwise configured to convey uplink payload data (e.g., data other than uplink control information). For example, the UE 115-*a* may use a short data field 215 in a PUCCH transmission 205 to send the beam failure recovery MAC-CE or any other control message that indicates information about the beam failure on the secondary cell 110-*b*. The short data field 215 may be referred to as "short" because this field may have a relatively small size compared to the overall size of the control message and/or the size of this field may accommodate relatively small payload data sizes. In cases where a PUCCH occasion occurs before an occasion to send the LRR, the UE 115-*a* may opportunistically use the PUCCH occasion to send the beam failure recovery MAC-CE rather than conveying the data in a PUSCH transmission granted by the base station 105-a. Such PUCCH occasions may include a number of control fields (e.g., used for sending HARQ-ACK feedback, CSI reports (CSI 1 and CSI 2), scheduling requests) along with a data field (e.g., a short data field) that the UE 115-a may use for conveying the beam failure recovery MAC-CE.

In such cases, the UE 115-a may identify the beam failure and may determine that a PUCCH occasion occurs before an occasion for sending an LRR. The UE 115-a may include the beam failure recovery request MAC-CE 215 in a short data field 215 of the PUCCH 205. Upon receiving the MAC-CE 215, the base station 105-a may transmit the beam failure recovery response to the UE 115-a. By using the short data field 215 of the PUCCH 205 to send the beam failure recovery MAC-CE, the UE 115-a may effectively bypass the additional signaling steps of transmitting the LRR and receiving the uplink grant from the base station 110-a. Instead, the UE 115-a may use the PUCCH occasions (e.g., which may be explicitly or implicitly granted by the base station 105-a) and which may occur periodically, to transmit the beam failure recovery MAC-CE (rather than sending an LRR, receiving a grant specific to sending the MAC-CE, and then transmitting the MAC-CE).

In addition to reducing signaling latency associated with mitigating the beam failure, the use of the short data field 215 in the PUCCH 205 to convey the beam failure recovery MAC CE may increase the reliability of the beam failure reporting. For example, the PUCCH 205 may be configured as a robust message such that it has a high probability of being reliably received by the base station 105-a (e.g., due to modulation and coding configurations selected for control messages). In addition, the use of the PUCCH 205 reduces signaling overhead, because the UE 115-a does not transmit an additional PUSCH for the beam failure recovery MAC-CE.

In some cases, the PUCCH occasions may occur periodically, and the UE 115-a may identify the PUCCH occasion via an implicit or explicit grant from the base station 105-a. In some other cases, however, the UE 115-a may determine that an occasion for sending an LRR occurs before a next PUCCH occasion. In such cases, the UE 115-a may determine to send an LRR in the LRR occasion, to which the UE 115-a receives an uplink grant for transmitting the beam failure recovery MAC-CE in a subsequent PUSCH. In some other cases, the UE 115-a may determine to refrain from sending the LRR and may instead wait for the next PUCCH occasion.

In some cases, the UE 115-a may determine that the payload of the PUCCH 205 (which includes the beam failure recovery MAC-CE) is larger than a size supported by a set of allocated resources of a slot. For example, in some cases multiple PUCCH occasions may coincide on the same slot (e.g., multiple bits of HARQ may be transmitted in one slot, periodic channel state information feedback (CSF) may occur on the same slot, or multiple occasions are concatenated to the same PUCCH payload). In such cases, the UE 115-a may evaluate the PUCCH resources in the slot, and may determine to omit a portion of the payload in order to reduce the coding rate. The UE 115-a may omit portions of the PUCCH 205 according to a number of priority rules. For example, in some examples, the UE 115-a may drop or shorten portions of the CSI1 or CSI 2, or the UE 115-a may shorten the short data field. In cases where the UE 115-a drops the short data field (which contains the beam failure recovery MAC-CE) the UE 115-a may default to the conventional beam failure recovery procedure (e.g., transmitting the LRR, receiving a grant for PUSCH, and sending the MAC-CE via the granted PUSCH resources).

Figure 3:
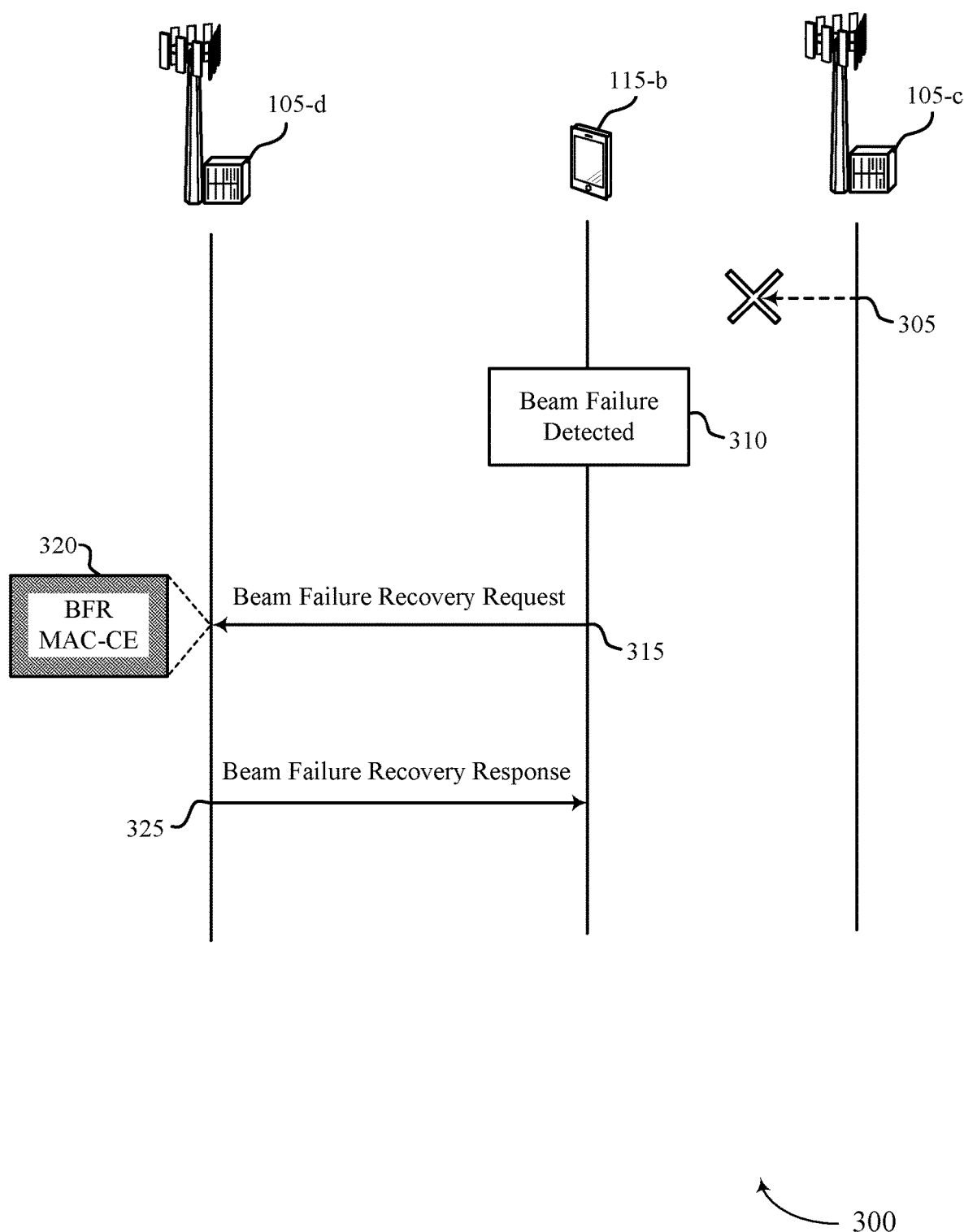
FIG. 3 illustrates an example of a process flow that supports beam failure reporting using data field in uplink control channel in accordance with aspects of the present disclosure.

FIG. 3 illustrates an example of a process flow 300 that supports beam failure reporting using data field in uplink control channel in accordance with aspects of the present disclosure. In some examples, process flow 300 may implement aspects of wireless communication systems 100 and 200. The process flow 300 includes UE 115-b, and base stations 105-c and 105-d (e.g., which may be examples of the corresponding devices described with reference to FIGS. 1-2). Alternative examples of the following may be implemented, where some steps are performed in a different order than described or are not performed at all. In some cases, steps may include additional features not mentioned below, or further steps may be added. In addition, while process flow 300 shows processes between base stations 105-c and 1105-d and UE 115-b, it should be understood that these processes may occur between any number of network devices.

At 305, the base station 105-c (which may serve a secondary cell on an FR2 frequency range) may transmit a signal to the UE 115-b using a first communication beam. In some cases, one or more communication beams associated with the transmission at 305 may experience interference, attenuation, or any other beam failure event such that the one or more beams do not effectively reach the UE 115-b or otherwise constitute a beam failure or beam failure event as described with reference to FIG. 2.

At 310, the UE 115-b may identify the beam failure event of the one or more beams associated with the secondary cell. To identify the beam failure event, the UE 115-b may identify that the signal quality of the one or more beams is below a threshold signal quality. In some other examples, the UE 115-b may identify a reduced signal strength of the one or more beams by measuring various beam quality metrics, or the UE 115-b may be configured to measure a beam failure detection references signal based on a periodic 1-port CSI-RS. In some other examples, the beam failure event may be identified when a number of consecutive beam failure instances from the base station 105-c surpasses a threshold number of beam failures.

At 315, the UE 115-b may transmit a beam failure recovery request in an uplink data field of a control message (e.g., a PUCCH message) to the base station 105-d on the primary cell of the UE 115-b. The uplink data field of the PUCCH may include a field configured to convey uplink payload data in addition to one or more additional fields configured to convey control information different from the uplink payload data (e.g., HARQ, UCI, CSI). The UE 115-b may transmit the PUCCH based on determining that an occasion for transmitting the PUCCH occurs before an occasion for transmitting an LRR associated with the beam failure. In some examples, the PUCCH occasion is associated with a first uplink resource that is different from a second uplink resource for transmitting the LRR. In some examples, the UE 115-b may transmit the PUCCH based on the PUCCH being a PUCCH format 0 or a PUCCH format 1. In some cases, the UE 115-b may transmit the beam failure recovery request based on a payload size of the beam failure recovery request and a size of the PUCCH message.

In some examples, the beam failure recovery request message may be a beam failure recovery MAC-CE 320. In some cases, the MAC-CE 320 may include the cell index associated with the failed beam (e.g., the secondary cell index). In some cases, the beam failure recovery MAC-CE 320 may include one or more potential new candidate beams on the secondary cell that identified to replace the failed beam.

At 325, the UE 115-*b* may receive a beam failure recovery response from the base station 105-*d* associated with the primary cell based on the transmitted beam failure recovery request. In some examples, the beam failure recovery response is a physical downlink control channel (PDCCH) message that indicates of a set of candidate beams to replace the one or more beams associated with the beam failure event.

Figure 4:
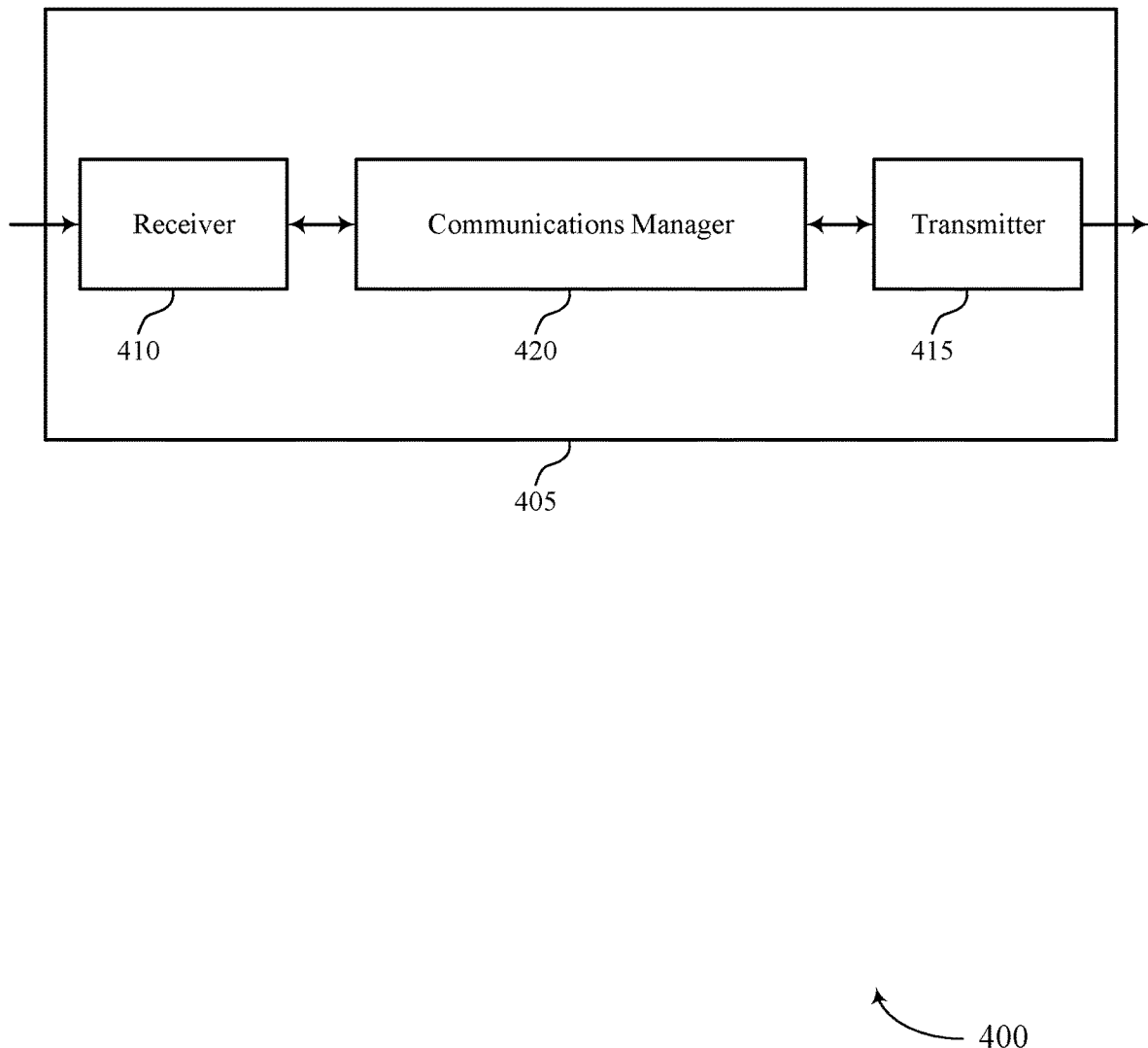
FIGS. 4 and 5 show block diagrams of devices that support beam failure reporting using data field in uplink control channel in accordance with aspects of the present disclosure.

FIG. 4 shows a block diagram 400 of a device 405 that supports beam failure reporting using data field in uplink control channel in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to beam failure reporting using data field in uplink control channel). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to beam failure reporting using data field in uplink control channel). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of beam failure reporting using data field in uplink control channel as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for identifying a beam failure event of one or more beams associated with a secondary cell of the UE. The communications manager 420 may be configured as or otherwise support a means for transmitting, on a primary cell of the UE, a beam failure recovery request in an uplink data field of a physical uplink control channel message, where the uplink data field is configured to convey uplink payload data. The communications manager 420 may be configured as or otherwise support a means for receiving, on the primary cell, a beam failure recovery response based on transmitting the beam failure recovery request.

In some examples, communications manager 420 may be implemented as an integrated circuit or chipset for a mobile device modem, and the receiver 410 and transmitter 415 may be implemented as analog components (e.g., amplifiers, filters, and antennas) coupled with the mobile device modem to enable wireless transmission and reception.

The communications manager 420 as described herein may be implemented to realize one or more potential advantages. At least one implementation may enable communications manager 420 to effectively identify beam failure on a secondary cell associated with a device and transmit a beam failure recovery request to a primary cell of the device. In such implementations, beam failure mitigation by the primary cell may be more efficient than procedures on the secondary cell. In some implementations, the communications manager 420 may be able to effectively bypass requesting an uplink grant and receiving an uplink grant for transmitting a beam failure report message. Instead, the communications manager 420 may format the beam failure report in a short data field of a control channel transmission.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for more efficient utilization of communication resources, reduced latency, reduced signaling overhead, and decreased network congestion. In addition, the techniques described herein may efficiently address beam failure events for devices supporting operations on different cells.

Figure 5:
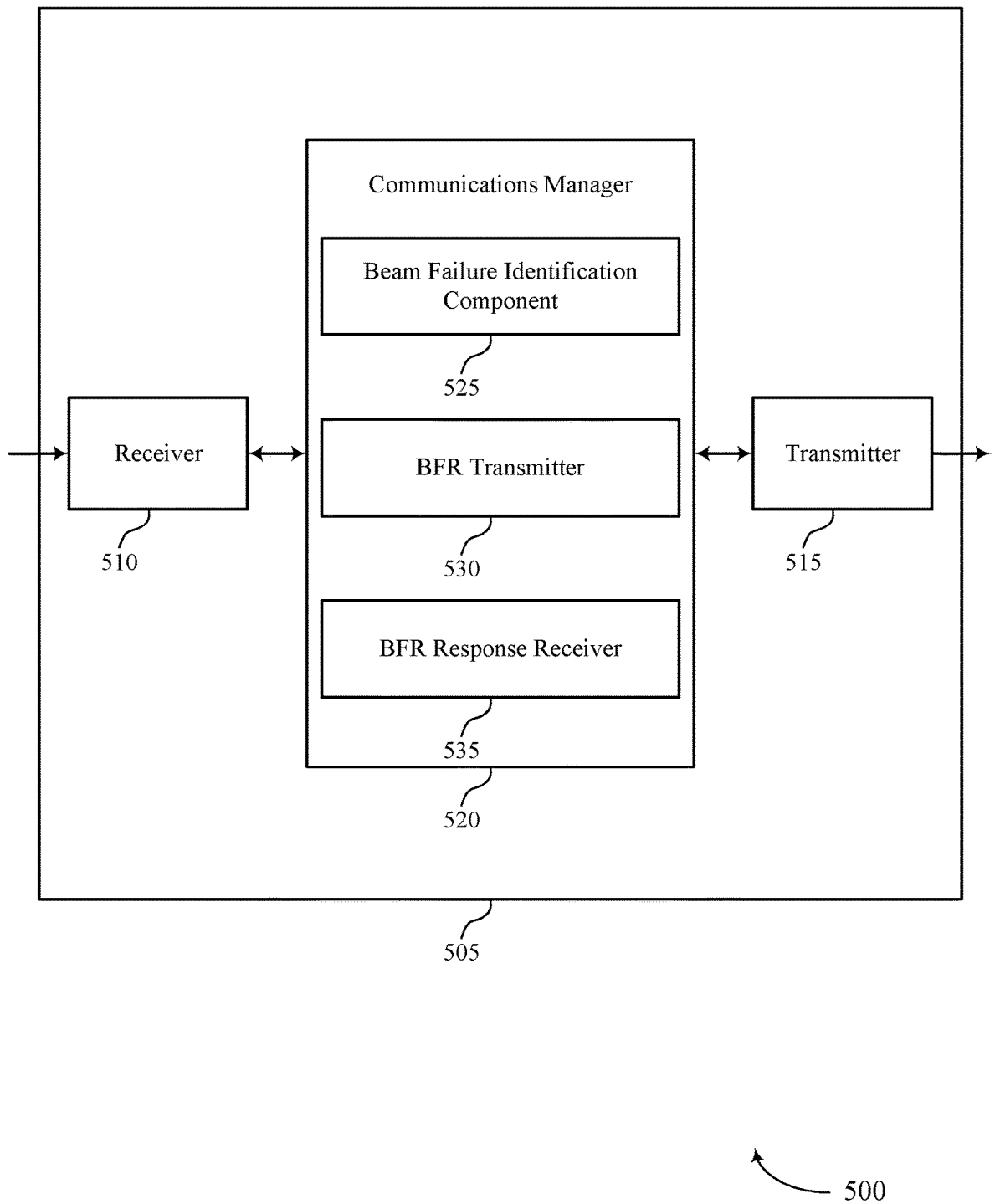

FIG. 5 shows a block diagram 500 of a device 505 that supports beam failure reporting using data field in uplink control channel in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to beam failure reporting using data field in uplink control channel). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to beam failure reporting using data field in uplink control channel). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of beam failure reporting using data field in uplink control channel as described herein. For example, the communications manager 520 may include a beam failure identification component 525, a beam failure reporting (BFR) transmitter 530, an BFR response receiver 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The beam failure identification component 525 may be configured as or otherwise support a means for identifying a beam failure event of one or more beams associated with a secondary cell of the UE. The BFR transmitter 530 may be configured as or otherwise support a means for transmitting, on a primary cell of the UE, a beam failure recovery request in an uplink data field of a physical uplink control channel message, where the uplink data field is configured to convey uplink payload data. The BFR response receiver 535 may be configured as or otherwise support a means for receiving, on the primary cell, a beam failure recovery response based on transmitting the beam failure recovery request.

Figure 6:
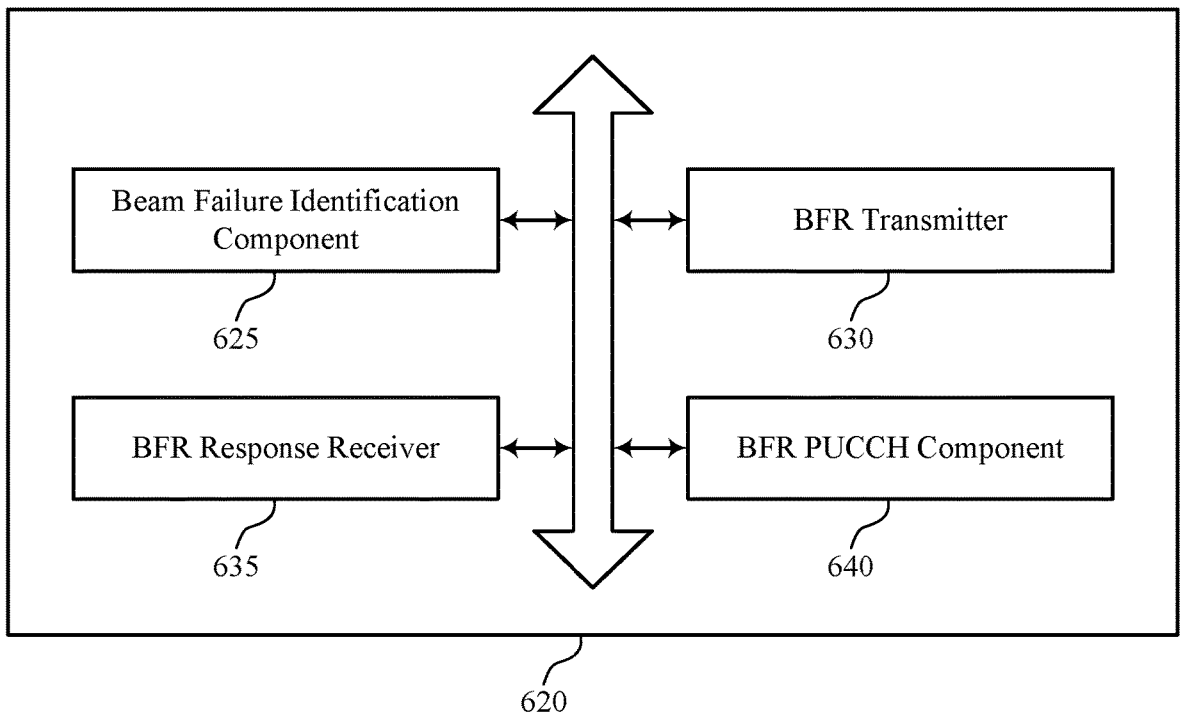
FIG. 6 shows a block diagram of a communications manager that supports beam failure reporting using data field in uplink control channel in accordance with aspects of the present disclosure.

FIG. 6 shows a block diagram 600 of a communications manager 620 that supports beam failure reporting using data field in uplink control channel in accordance with aspects of the present disclosure. The communications manager 620 may be an example of aspects of a communications manager 420, a communications manager 520, or both, as described herein. The communications manager 620, or various components thereof, may be an example of means for performing various aspects of beam failure reporting using data field in uplink control channel as described herein. For example, the communications manager 620 may include a beam failure identification component 625, an BFR transmitter 630, an BFR response receiver 635, an BFR PUCCH component 640, or any combination thereof. Each of these components may communicate, directly or indirectly, with one another (e.g., via one or more buses).

The communications manager 620 may support wireless communications at a UE in accordance with examples as disclosed herein. The beam failure identification component 625 may be configured as or otherwise support a means for identifying a beam failure event of one or more beams associated with a secondary cell of the UE. The BFR transmitter 630 may be configured as or otherwise support a means for transmitting, on a primary cell of the UE, a beam failure recovery request in an uplink data field of a physical uplink control channel message, where the uplink data field is configured to convey uplink payload data. The BFR response receiver 635 may be configured as or otherwise support a means for receiving, on the primary cell, a beam failure recovery response based on transmitting the beam failure recovery request.

In some examples, an occasion for transmitting the physical uplink control channel message occurs before an occasion for transmitting a link recovery request associated with the beam failure event.

In some examples, the occasion for transmitting the physical uplink control channel is associated with a first uplink resource and the occasion for transmitting the link recovery request is associated with a second uplink resource different from the first uplink resource. In some examples, the beam failure recovery request includes a MAC-CE conveying beam failure information associated with the one or more beams on the secondary cell. In some examples, the beam failure information includes an index of the secondary cell, a number of candidate beams to replace the one or more beams, or both.

In some examples, the physical uplink control channel message includes one or more additional fields configured to convey uplink control information, the uplink control information different from the uplink payload data. In some examples, the beam failure recovery response includes a physical downlink control channel message and indicates of a set of candidate beams to replace the one or more beams associated with the beam failure event.

In some examples, the BFR PUCCH component 640 may be configured as or otherwise support a means for transmitting the beam failure recovery request in the uplink data field of the physical uplink control channel message based on a payload size of the beam failure recovery request.

In some examples, the uplink data field is configured based on a format of the physical uplink control channel message.

Figure 7:
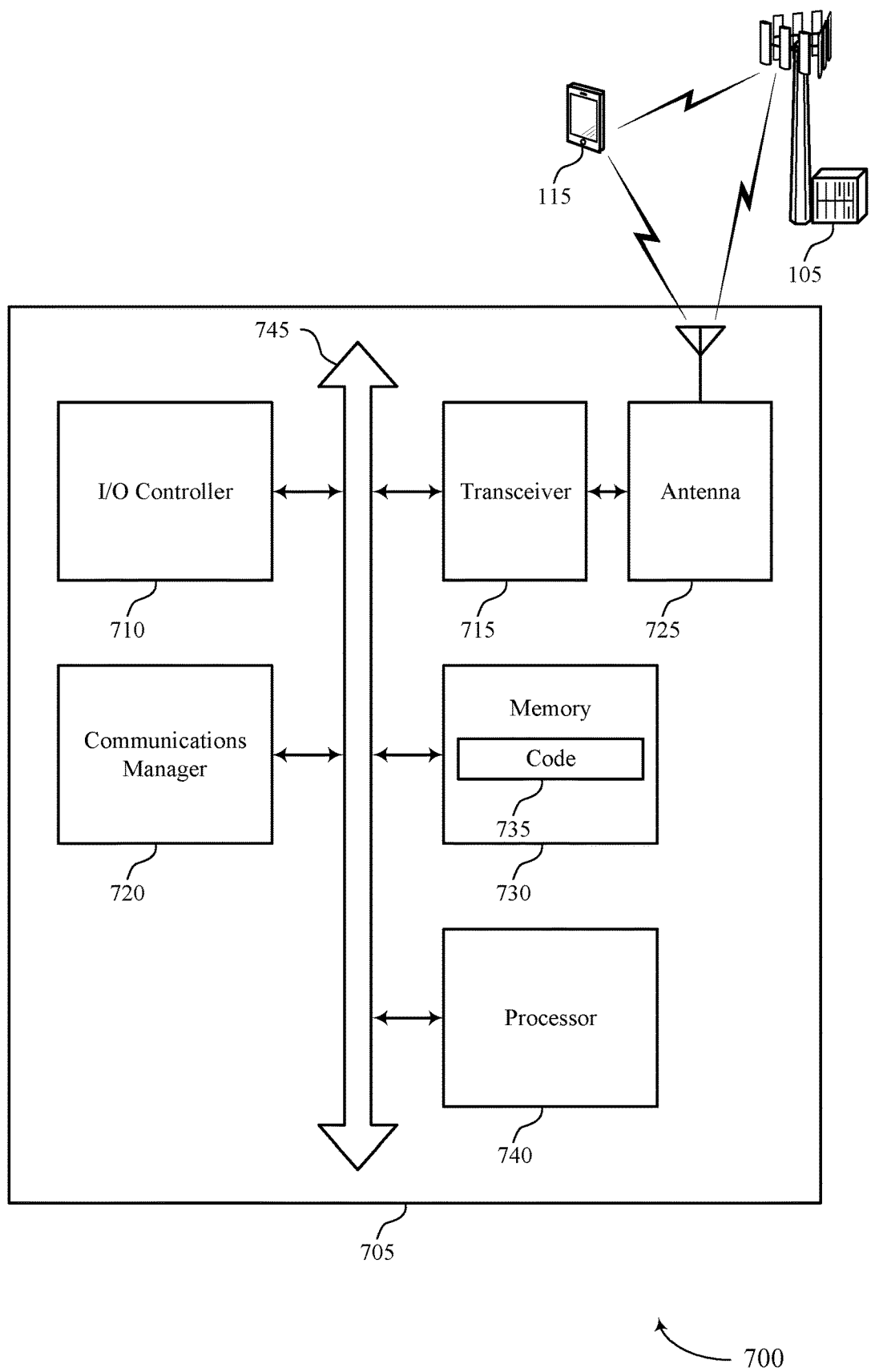
FIG. 7 shows a diagram of a system including a device that supports beam failure reporting using data field in uplink control channel in accordance with aspects of the present disclosure.

FIG. 7 shows a diagram of a system 700 including a device 705 that supports beam failure reporting using data field in uplink control channel in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting beam failure reporting using data field in uplink control channel). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for identifying a beam failure event of one or more beams associated with a secondary cell of the UE. The communications manager 720 may be configured as or otherwise support a means for transmitting, on a primary cell of the UE, a beam failure recovery request in an uplink data field of a physical uplink control channel message, where the uplink data field is configured to convey uplink payload data. The communications manager 720 may be configured as or otherwise support a means for receiving, on the primary cell, a beam failure recovery response based on transmitting the beam failure recovery request.

By including or configuring the communications manager 720 in accordance with examples as described herein, the device 705 may support techniques for improved communication reliability, reduced latency, improved user experience related to improved beam failure mitigation, more efficient utilization of communication resources (e.g., using a short data field of the PUCCH rather than requesting a grant for an additional PUSCH), and improved utilization of signaling capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of beam failure reporting using data field in uplink control channel as described herein, or the processor 740 and the memory 730 may be otherwise configured to perform or support such operations.

Figure 8:
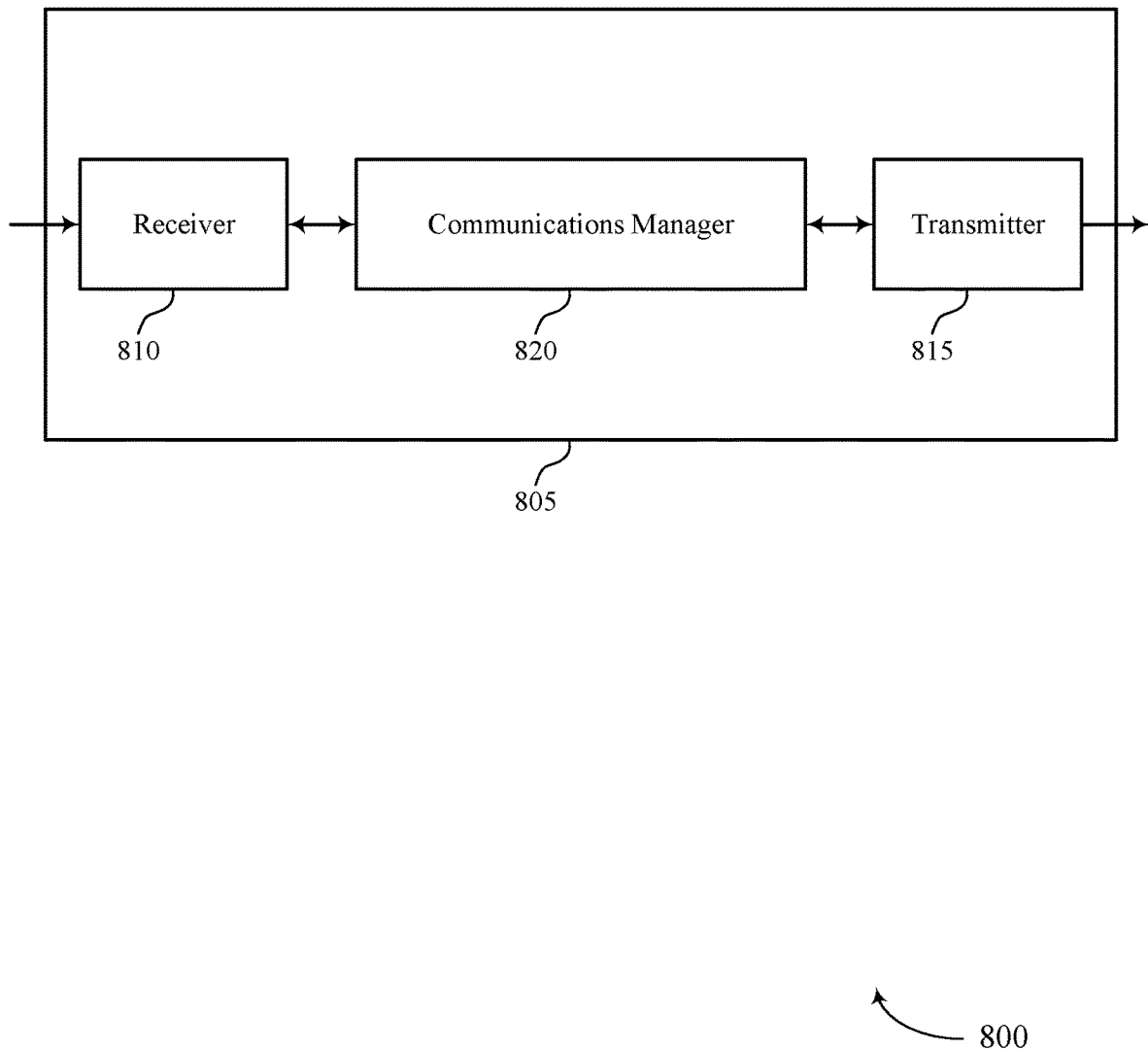
FIGS. 8 and 9 show block diagrams of devices that support beam failure reporting using data field in uplink control channel in accordance with aspects of the present disclosure.

FIG. 8 shows a block diagram 800 of a device 805 that supports beam failure reporting using data field in uplink control channel in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to beam failure reporting using data field in uplink control channel). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to beam failure reporting using data field in uplink control channel). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of beam failure reporting using data field in uplink control channel as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station associated with a primary cell in accordance with examples as disclosed herein. For example, the communications manager 820 may be configured as or otherwise support a means for receiving, from a UE, a beam failure recovery request for one or more beams associated with a secondary cell of the UE, where the beam failure recovery request is formatted in an uplink data field of a physical uplink control channel message that is configured to convey uplink payload data. The communications manager 820 may be configured as or otherwise support a means for transmitting a beam failure recovery response based on receiving the beam failure recovery request.

In some examples, communications manager 820 may be implemented as an integrated circuit or chipset for a mobile device modem, and the receiver 810 and transmitter 815 may be implemented as analog components (e.g., amplifiers, filters, and antennas) coupled with the mobile device modem to enable wireless transmission and reception.

The communications manager 820 as described herein may be implemented to realize one or more potential advantages. At least one implementation may enable communications manager 820 to effectively identify beam failure on a secondary cell associated with a device and transmit a beam failure recovery request to a primary cell of the device. In such implementations, beam failure mitigation by the primary cell may be more efficient than procedures on the secondary cell. In some implementations, the communications manager 820 may be able to effectively bypass requesting an uplink grant and receiving an uplink grant for transmitting a beam failure report message. Instead, the communications manager 820 may format the beam failure report in a short data field of a control channel transmission.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for more efficient utilization of communication resources, reduced latency, reduced signaling overhead, and decreased network congestion. In addition, the techniques described herein may efficiently address beam failure events for devices supporting operations on different cells.

Figure 9:
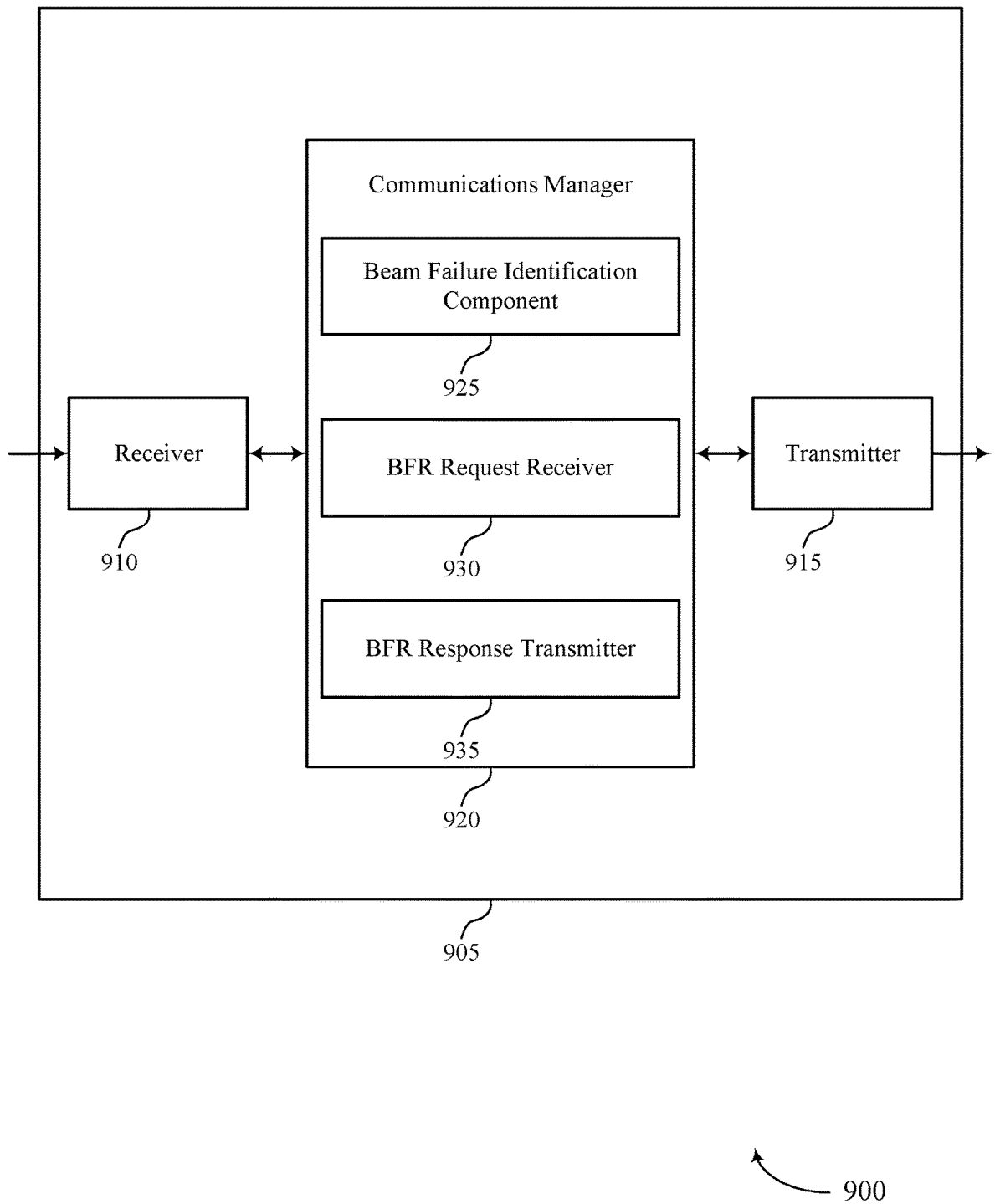

FIG. 9 shows a block diagram 900 of a device 905 that supports beam failure reporting using data field in uplink control channel in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to beam failure reporting using data field in uplink control channel). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to beam failure reporting using data field in uplink control channel). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of beam failure reporting using data field in uplink control channel as described herein. For example, the communications manager 920 may include a beam failure identification component 925, an BFR request receiver 930, an BFR response transmitter 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station associated with a primary cell in accordance with examples as disclosed herein. The BFR request receiver 930 may be configured as or otherwise support a means for receiving, from a UE, a beam failure recovery request for one or more beams associated with a secondary cell of the UE, where the beam failure recovery request is formatted in an uplink data field of a physical uplink control channel message that is configured to convey uplink payload data. The BFR response transmitter 935 may be configured as or otherwise support a means for transmitting a beam failure recovery response based on receiving the beam failure recovery request.

Figure 10:
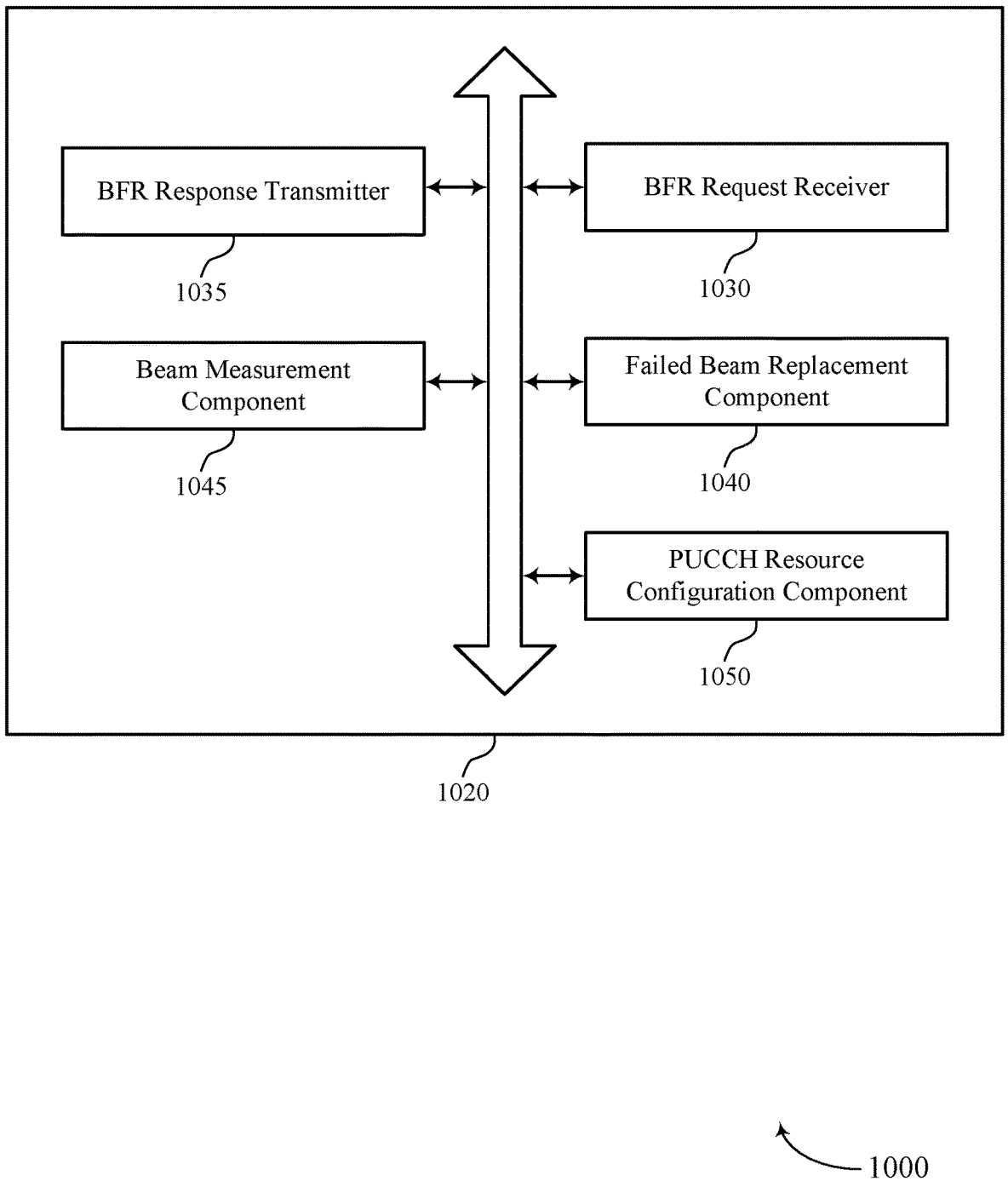
FIG. 10 shows a block diagram of a communications manager that supports beam failure reporting using data field in uplink control channel in accordance with aspects of the present disclosure.

FIG. 10 shows a block diagram 1000 of a communications manager 1020 that supports beam failure reporting using data field in uplink control channel in accordance with aspects of the present disclosure. The communications manager 1020 may be an example of aspects of a communications manager 820, a communications manager 920, or both, as described herein. The communications manager 1020, or various components thereof, may be an example of means for performing various aspects of beam failure reporting using data field in uplink control channel as described herein. For example, the communications manager 1020 may include a BFR request receiver 1030, an BFR response transmitter 1035, a failed beam replacement component 1040, a beam measurement component 1045, a PUCCH resource configuration component 1050, or any combination thereof. Each of these components may communicate, directly or indirectly, with one another (e.g., via one or more buses).

The communications manager 1020 may support wireless communications at a base station associated with a primary cell in accordance with examples as disclosed herein. The BFR request receiver 1030 may be configured as or otherwise support a means for receiving, from a UE, a beam failure recovery request for one or more beams associated with a secondary cell of the UE, where the beam failure recovery request is formatted in an uplink data field of a physical uplink control channel message that is configured to convey uplink payload data. The BFR response transmitter 1035 may be configured as or otherwise support a means for transmitting a beam failure recovery response based on receiving the beam failure recovery request.

In some examples, an occasion for receiving the physical uplink control channel message occurs before an occasion for receiving a link recovery request associated with the beam failure event.

In some examples, the PUCCH resource configuration component 1050 may be configured as or otherwise support a means for configuring a first uplink resource for the UE to transmit the physical uplink control channel and a second uplink resource for the UE to transmit the link recovery request, where the first uplink resource is different from the second uplink resource.

In some examples, the beam failure recovery request includes a MAC-CE conveying beam failure information associated with the one or more beams on the secondary cell. In some examples, the beam failure information includes an index of the secondary cell, a number of candidate beams to replace the one or more beams, or both.

In some examples, the physical uplink control channel message includes one or more additional fields configured to convey uplink control information, the uplink control information different from the uplink payload data.

In some examples, the failed beam replacement component 1040 may be configured as or otherwise support a means for identifying one or more candidate beams to replace the one or more beams indicated in the beam failure report. In some examples, the beam measurement component 1045 may be configured as or otherwise support a means for selecting a set of the one or more candidate beams based on a set of multiple beam metrics identified determined for the one or more candidate beams. In some examples, the BFR response transmitter 1035 may be configured as or otherwise support a means for transmitting the beam failure recovery response including the set of candidate beams to replace the one or more beams associated with the beam failure event.

In some examples, the beam measurement component 1045 may be configured as or otherwise support a means for performing one or more measurements on the one or more candidate beams associated with the secondary cell based on the beam failure report.

In some examples, the BFR request receiver 1030 may be configured as or otherwise support a means for receiving the beam failure recovery request in the uplink data field of the physical uplink control channel message based on a payload size of the beam failure recovery request.

In some examples, the uplink data field is received in accordance with a format of the physical uplink control channel message.

Figure 11:
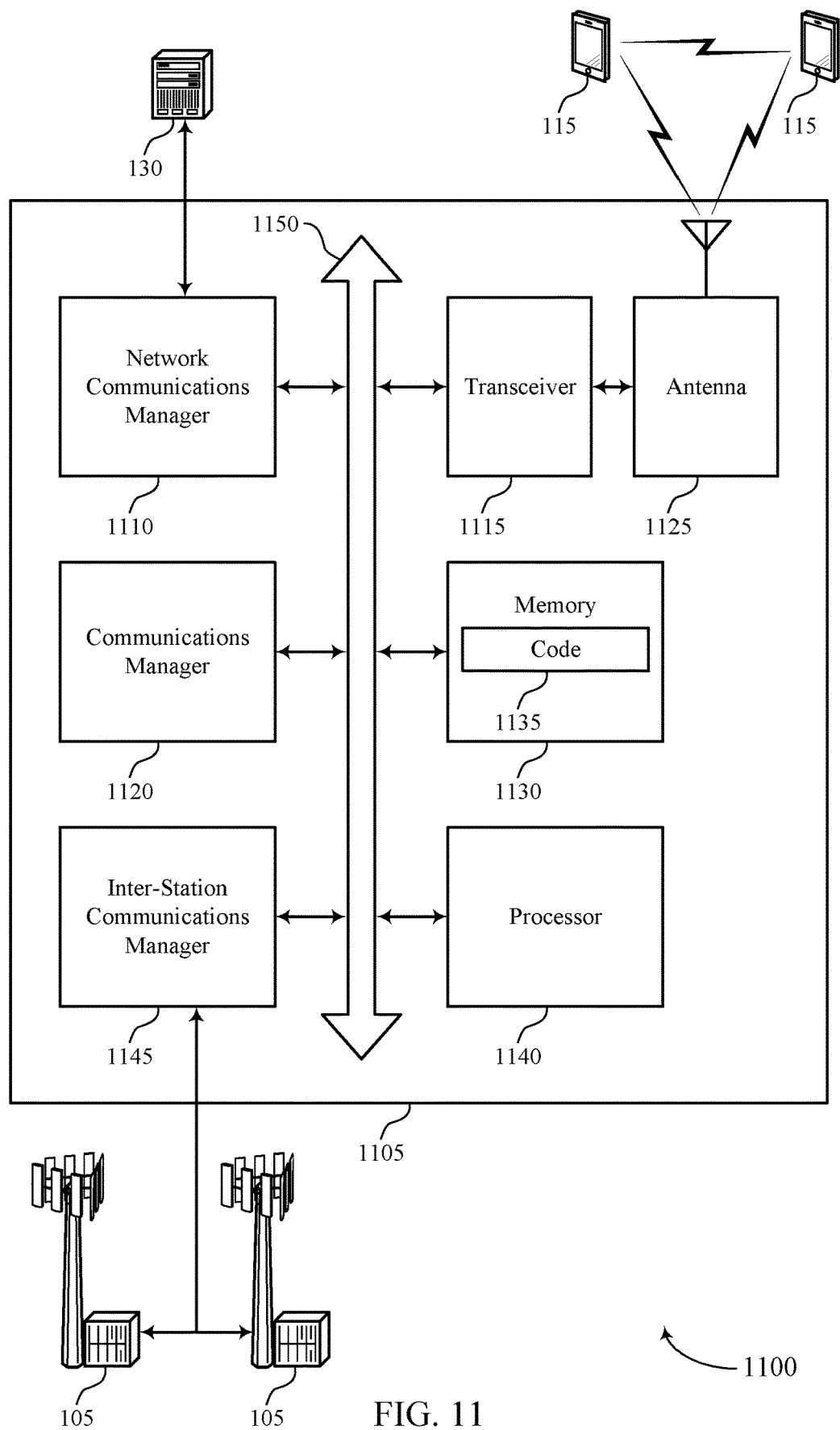
FIG. 11 shows a diagram of a system including a device that supports beam failure reporting using data field in uplink control channel in accordance with aspects of the present disclosure.

FIG. 11 shows a diagram of a system 1100 including a device 1105 that supports beam failure reporting using data field in uplink control channel in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting beam failure reporting using data field in uplink control channel). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station associated with a primary cell in accordance with examples as disclosed herein. For example, the communications manager 1120 may be configured as or otherwise support a means for receiving, from a UE, a beam failure recovery request for one or more beams associated with a secondary cell of the UE, where the beam failure recovery request is formatted in an uplink data field of a physical uplink control channel message that is configured to convey uplink payload data. The communications manager 1120 may be configured as or otherwise support a means for transmitting a beam failure recovery response based on receiving the beam failure recovery request.

By including or configuring the communications manager 1120 in accordance with examples as described herein, the device 1105 may support techniques for improved communication reliability, reduced latency, improved user experience related to improved beam failure mitigation, more efficient utilization of communication resources (e.g., using a short data field of the PUCCH rather than requesting a grant for an additional PUSCH), and improved utilization of signaling capability, and efficient beam reselection after a beam failure event.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of beam failure reporting using data field in uplink control channel as described herein, or the processor 1140 and the memory 1130 may be otherwise configured to perform or support such operations.

Figure 12:
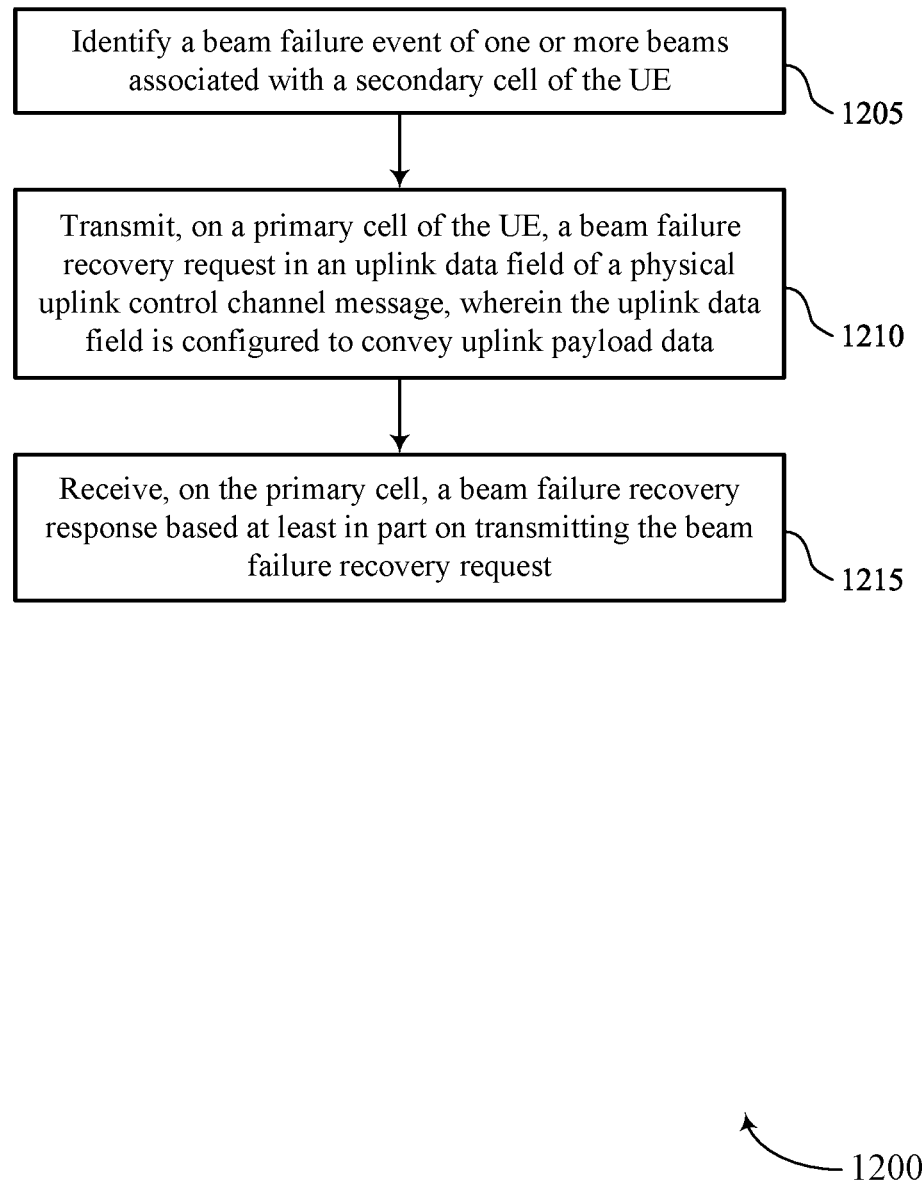
FIGS. 12 through 16 show flowcharts illustrating methods that support beam failure reporting using data field in uplink control channel in accordance with aspects of the present disclosure.

FIG. 12 shows a flowchart illustrating a method 1200 that supports beam failure reporting using data field in uplink control channel in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include identifying a beam failure event of one or more beams associated with a secondary cell of the UE. The operations of 1205 may be performed in accordance with examples as disclosed herein. In some examples, aspects of the operations of 1205 may be performed by a beam failure identification component 625 as described with reference to FIG. 6.

At 1210, the method may include transmitting, on a primary cell of the UE, a beam failure recovery request in an uplink data field of a physical uplink control channel message, where the uplink data field is configured to convey uplink payload data. The operations of 1210 may be performed in accordance with examples as disclosed herein. In some examples, aspects of the operations of 1210 may be performed by an BFR transmitter 630 as described with reference to FIG. 6.

At 1215, the method may include receiving, on the primary cell, a beam failure recovery response based on transmitting the beam failure recovery request. The operations of 1215 may be performed in accordance with examples as disclosed herein. In some examples, aspects of the operations of 1215 may be performed by an BFR response receiver 635 as described with reference to FIG. 6.

Figure 13:
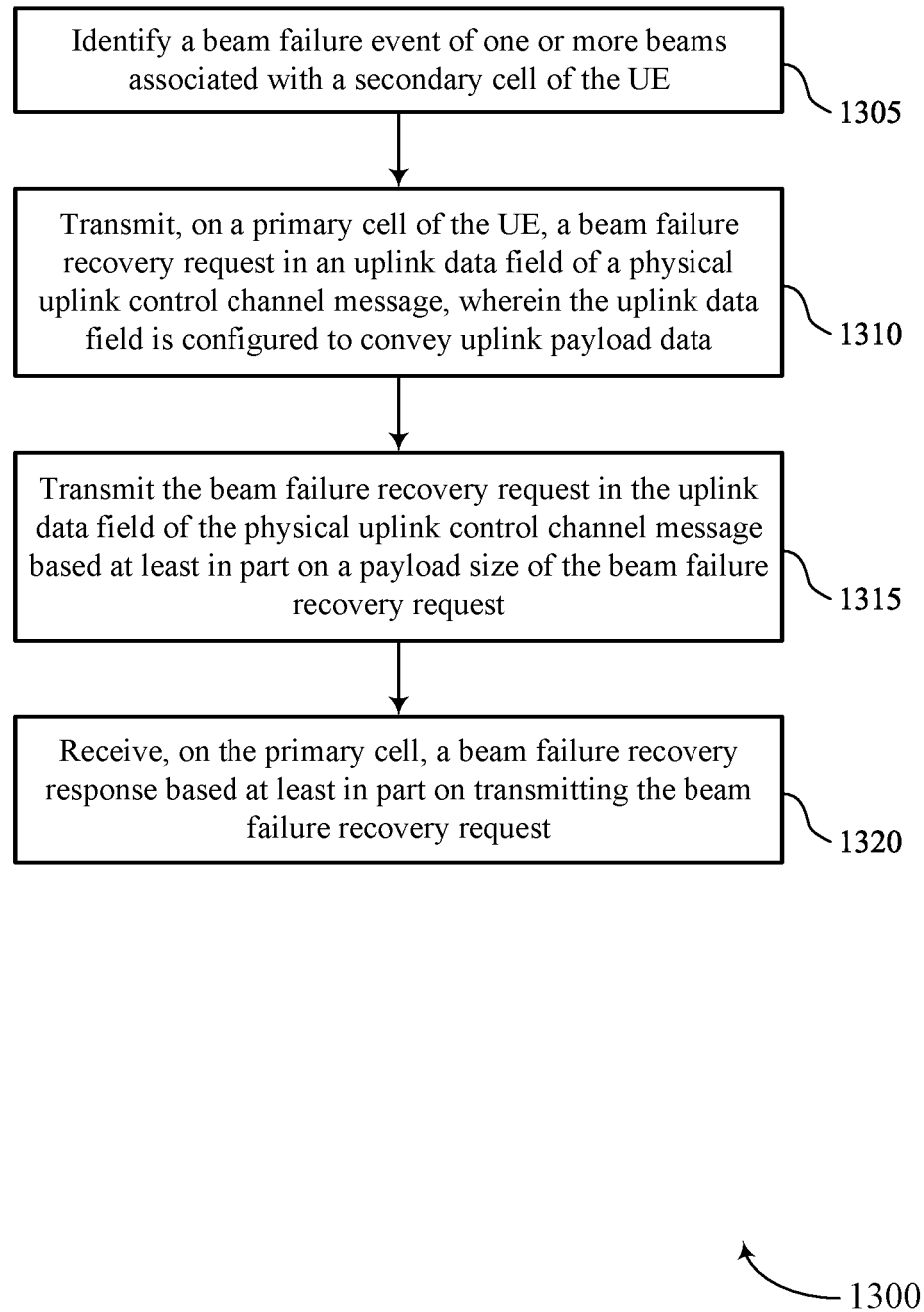

FIG. 13 shows a flowchart illustrating a method 1300 that supports beam failure reporting using data field in uplink control channel in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include identifying a beam failure event of one or more beams associated with a secondary cell of the UE. The operations of 1305 may be performed in accordance with examples as disclosed herein. In some examples, aspects of the operations of 1305 may be performed by a beam failure identification component 625 as described with reference to FIG. 6.

At 1310, the method may include transmitting, on a primary cell of the UE, a beam failure recovery request in an uplink data field of a physical uplink control channel message, where the uplink data field is configured to convey uplink payload data. The operations of 1310 may be performed in accordance with examples as disclosed herein. In some examples, aspects of the operations of 1310 may be performed by an BFR transmitter 630 as described with reference to FIG. 6.

At 1315, the method may include transmitting the beam failure recovery request in the uplink data field of the physical uplink control channel message based on a payload size of the beam failure recovery request. The operations of 1315 may be performed in accordance with examples as disclosed herein. In some examples, aspects of the operations of 1315 may be performed by an BFR PUCCH component 640 as described with reference to FIG. 6.

At 1320, the method may include receiving, on the primary cell, a beam failure recovery response based on transmitting the beam failure recovery request. The operations of 1320 may be performed in accordance with examples as disclosed herein. In some examples, aspects of the operations of 1320 may be performed by an BFR response receiver 635 as described with reference to FIG. 6.

Figure 14:
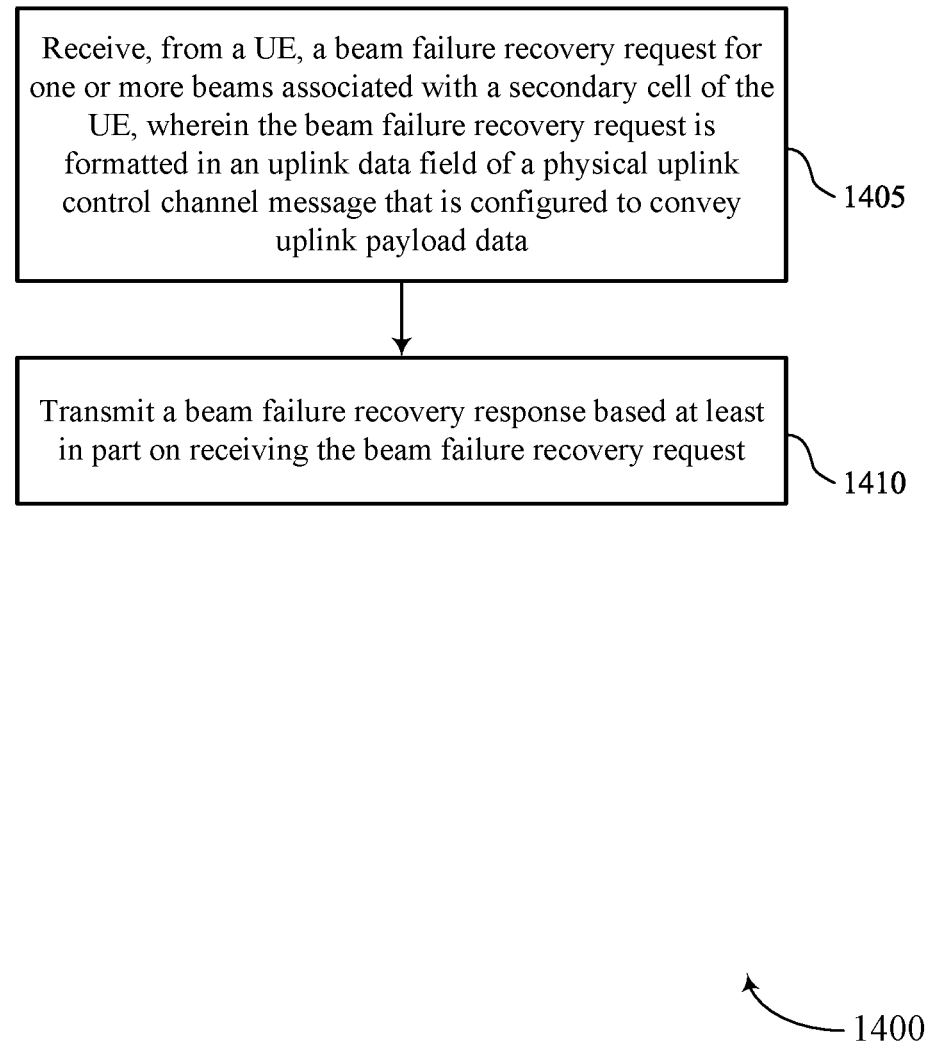

FIG. 14 shows a flowchart illustrating a method 1400 that supports beam failure reporting using data field in uplink control channel in accordance with aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1405, the method may include receiving, from a UE, a beam failure recovery request for one or more beams associated with a secondary cell of the UE, where the beam failure recovery request is formatted in an uplink data field of a physical uplink control channel message that is configured to convey uplink payload data. The operations of 1405 may be performed in accordance with examples as disclosed herein. In some examples, aspects of the operations of 1405 may be performed by an BFR request receiver 1030 as described with reference to FIG. 10.

At 1410, the method may include transmitting a beam failure recovery response based on receiving the beam failure recovery request. The operations of 1410 may be performed in accordance with examples as disclosed herein. In some examples, aspects of the operations of 1410 may be performed by an BFR response transmitter 1035 as described with reference to FIG. 10.

Figure 15:
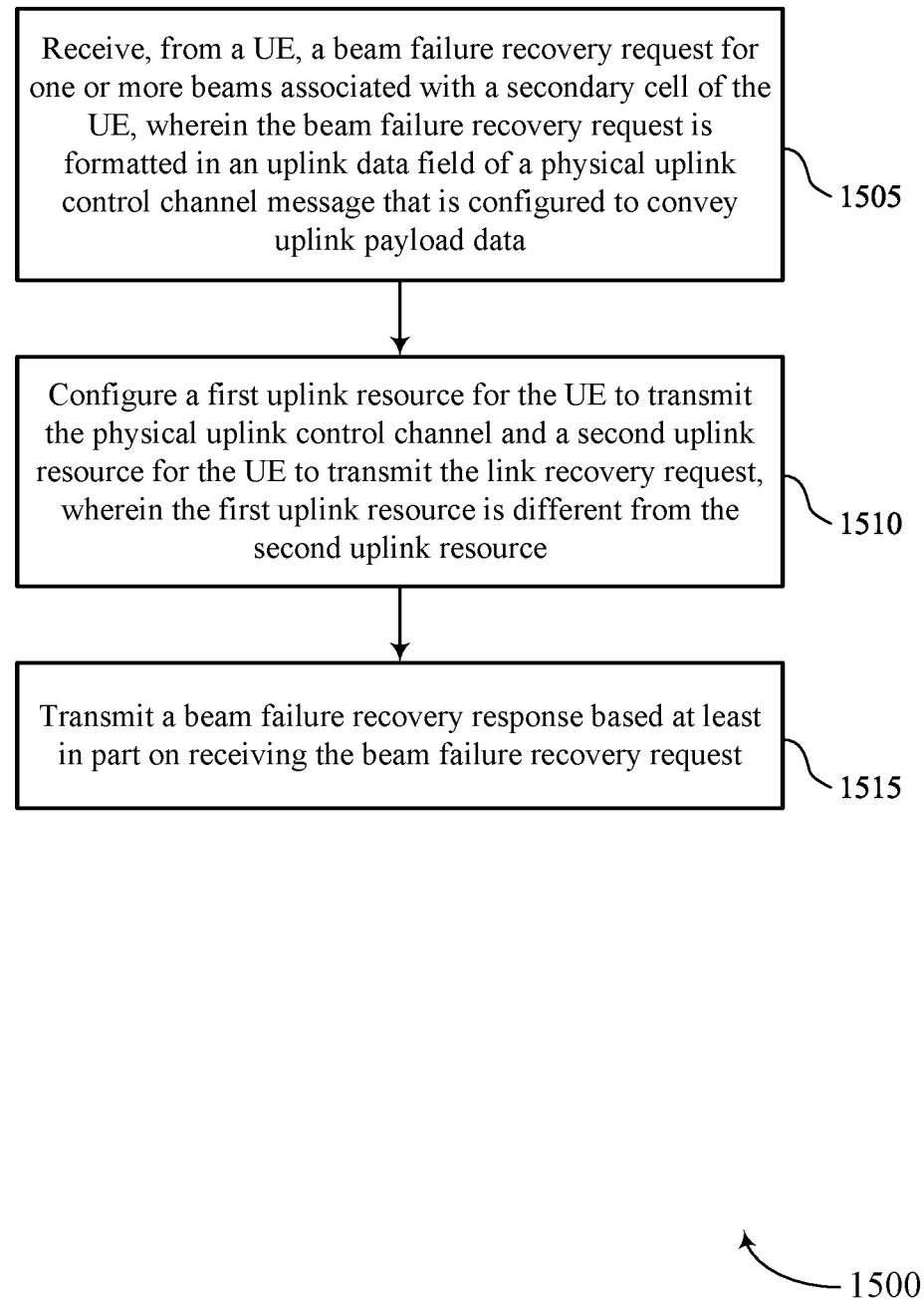

FIG. 15 shows a flowchart illustrating a method 1500 that supports beam failure reporting using data field in uplink control channel in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include receiving, from a UE, a beam failure recovery request for one or more beams associated with a secondary cell of the UE, where the beam failure recovery request is formatted in an uplink data field of a physical uplink control channel message that is configured to convey uplink payload data. The operations of 1505 may be performed in accordance with examples as disclosed herein. In some examples, aspects of the operations of 1505 may be performed by an BFR request receiver 1030 as described with reference to FIG. 10.

At 1510, the method may include configuring a first uplink resource for the UE to transmit the physical uplink control channel and a second uplink resource for the UE to transmit the link recovery request, where the first uplink resource is different from the second uplink resource. The operations of 1510 may be performed in accordance with examples as disclosed herein. In some examples, aspects of the operations of 1510 may be performed by a PUCCH resource configuration component 1050 as described with reference to FIG. 10.

At 1515, the method may include transmitting a beam failure recovery response based on receiving the beam failure recovery request. The operations of 1515 may be performed in accordance with examples as disclosed herein. In some examples, aspects of the operations of 1515 may be performed by an BFR response transmitter 1035 as described with reference to FIG. 10.

Figure 16:
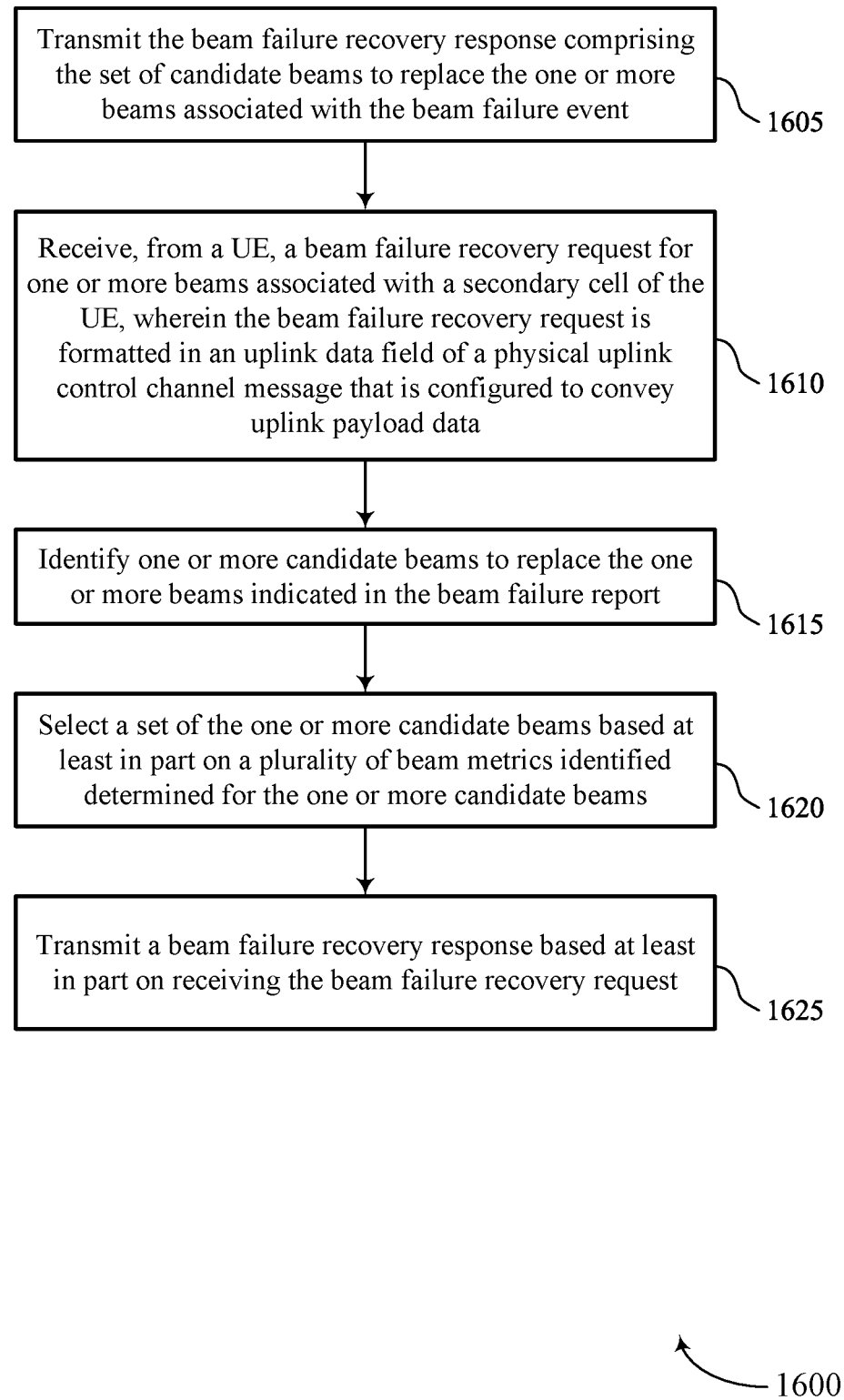

FIG. 16 shows a flowchart illustrating a method 1600 that supports beam failure reporting using data field in uplink control channel in accordance with aspects of the present disclosure. The operations of the method 1600 may be implemented by a base station or its components as described herein. For example, the operations of the method 1600 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1605, the method may include transmitting the beam failure recovery response including the set of candidate beams to replace the one or more beams associated with the beam failure event. The operations of 1605 may be performed in accordance with examples as disclosed herein. In some examples, aspects of the operations of 1605 may be performed by an BFR response transmitter 1035 as described with reference to FIG. 10.

At 1610, the method may include receiving, from a UE, a beam failure recovery request for one or more beams associated with a secondary cell of the UE, where the beam failure recovery request is formatted in an uplink data field of a physical uplink control channel message that is configured to convey uplink payload data. The operations of 1610 may be performed in accordance with examples as disclosed herein. In some examples, aspects of the operations of 1610 may be performed by an BFR request receiver 1030 as described with reference to FIG. 10.

At 1615, the method may include identifying one or more candidate beams to replace the one or more beams indicated in the beam failure report. The operations of 1615 may be performed in accordance with examples as disclosed herein. In some examples, aspects of the operations of 1615 may be performed by a failed beam replacement component 1040 as described with reference to FIG. 10.

At 1620, the method may include selecting a set of the one or more candidate beams based on a set of multiple beam metrics identified determined for the one or more candidate beams. The operations of 1620 may be performed in accordance with examples as disclosed herein. In some examples, aspects of the operations of 1620 may be performed by a beam measurement component 1045 as described with reference to FIG. 10.

At 1625, the method may include transmitting a beam failure recovery response based on receiving the beam failure recovery request. The operations of 1625 may be performed in accordance with examples as disclosed herein. In some examples, aspects of the operations of 1625 may be performed by an BFR response transmitter 1035 as described with reference to FIG. 10.

The following provides an overview of aspects of the present disclosure:

Aspect 1: A method for wireless communications at a UE, comprising: identifying a beam failure event of one or more beams associated with a secondary cell of the UE; transmitting, on a primary cell of the UE, a beam failure recovery request in an uplink data field of a physical uplink control channel message, wherein the uplink data field is configured to convey uplink payload data; and receiving, on the primary cell, a beam failure recovery response based at least in part on transmitting the beam failure recovery request.

Aspect 2: The method of aspect 1, wherein an occasion for transmitting the physical uplink control channel message occurs before an occasion for transmitting a link recovery request associated with the beam failure event.

Aspect 3: The method of aspect 2, wherein the occasion for transmitting the physical uplink control channel message is associated with a first uplink resource and the occasion for transmitting the link recovery request is associated with a second uplink resource different from the first uplink resource.

Aspect 4: The method of any of aspects 1 through 3, wherein the beam failure recovery request comprises a medium access control-control element conveying beam failure information associated with the one or more beams on the secondary cell.

Aspect 5: The method of aspect 4, wherein the beam failure information comprises an index of the secondary cell, a number of candidate beams to replace the one or more beams, or both.

Aspect 6: The method of any of aspects 1 through 5, wherein the physical uplink control channel message comprises one or more additional fields configured to convey uplink control information, the uplink control information different from the uplink payload data.

Aspect 7: The method of any of aspects 1 through 6, wherein the beam failure recovery response comprises a physical downlink control channel message and indicates of a set of candidate beams to replace the one or more beams associated with the beam failure event.

Aspect 8: The method of any of aspects 1 through 7, further comprising: transmitting the beam failure recovery request in the uplink data field of the physical uplink control channel message based at least in part on a payload size of the beam failure recovery request.

Aspect 9: The method of any of aspects 1 through 8, wherein the uplink data field is configured based at least in part on a format of the physical uplink control channel message.

Aspect 10: A method for wireless communications at a base station associated with a primary cell, comprising: receiving, from a UE, a beam failure recovery request for one or more beams associated with a secondary cell of the UE, wherein the beam failure recovery request is formatted in an uplink data field of a physical uplink control channel message that is configured to convey uplink payload data; and transmitting a beam failure recovery response based at least in part on receiving the beam failure recovery request.

Aspect 11: The method of aspect 10, wherein an occasion for receiving the physical uplink control channel message occurs before an occasion for receiving a link recovery request associated with the one or more beams.

Aspect 12: The method of aspect 11, further comprising: configuring a first uplink resource for the UE to transmit the physical uplink control channel message and a second uplink resource for the UE to transmit the link recovery request, wherein the first uplink resource is different from the second uplink resource.

Aspect 13: The method of any of aspects 10 through 12, wherein the beam failure recovery request comprises a medium access control-control element conveying beam failure information associated with the one or more beams on the secondary cell.

Aspect 14: The method of aspect 13, wherein the beam failure information comprises an index of the secondary cell, a number of candidate beams to replace the one or more beams, or both.

Aspect 15: The method of any of aspects 10 through 14, wherein the physical uplink control channel message comprises one or more additional fields configured to convey uplink control information, the uplink control information different from the uplink payload data.

Aspect 16: The method of any of aspects 10 through 15, further comprising: identifying one or more candidate beams to replace the one or more beams indicated in the beam failure recovery request; selecting a set of the one or more candidate beams based at least in part on a plurality of beam metrics identified determined for the one or more candidate beams; and transmitting the beam failure recovery response comprising the set of the one or more candidate beams to replace the one or more beams.

Aspect 17: The method of aspect 16, further comprising: performing one or more measurements on the one or more candidate beams associated with the secondary cell based at least in part on the beam failure recovery request.

Aspect 18: The method of any of aspects 10 through 17, further comprising: receiving the beam failure recovery request in the uplink data field of the physical uplink control channel message based at least in part on a payload size of the beam failure recovery request.

Aspect 19: The method of any of aspects 10 through 18, wherein the uplink data field is received in accordance with a format of the physical uplink control channel message.

Aspect 20: An apparatus for wireless communications at a UE, comprising: a processor; memory coupled with the processor; and instructions stored in the memory and executable by the processor to cause the apparatus to perform a method of any of aspects 1 through 9.

Aspect 21: An apparatus for wireless communications at a UE, comprising at least one means for performing a method of any of aspects 1 through 9.

Aspect 22: A non-transitory computer-readable medium storing code for wireless communications at a UE, the code comprising instructions executable by a processor to perform a method of any of aspects 1 through 9.

Aspect 23: An apparatus for wireless communications at a base station associated with a primary cell, comprising a processor; memory coupled with the processor; and instructions stored in the memory and executable by the processor to cause the apparatus to perform a method of any of aspects 10 through 19.

Aspect 24: An apparatus for wireless communications at a base station associated with a primary cell, comprising at least one means for performing a method of any of aspects 10 through 19.

Aspect 25: A non-transitory computer-readable medium storing code for wireless communications at a base station associated with a primary cell, the code comprising instructions executable by a processor to perform a method of any of aspects 10 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   identifying a beam failure event of one or more beams associated with a secondary cell of the UE;
   transmitting, on a primary cell of the UE, a beam failure recovery request in an uplink data field of a physical uplink control channel message, the physical uplink control channel message comprising one or more additional fields configured to convey uplink control information, wherein the uplink data field is configured to convey uplink payload data different from the uplink control information, and wherein an occasion for transmitting the physical uplink control channel message occurs before an occasion for transmitting a link recovery request associated with the beam failure event; and
   receiving, on the primary cell, a beam failure recovery response based at least in part on transmitting the beam failure recovery request.

2. The method of claim 1, wherein the occasion for transmitting the physical uplink control channel message is associated with a first uplink resource and the occasion for transmitting the link recovery request is associated with a second uplink resource different from the first uplink resource.

3. The method of claim 1, wherein the beam failure recovery request comprises a medium access control-control element conveying beam failure information associated with the one or more beams on the secondary cell.

4. The method of claim 3, wherein the beam failure information comprises an index of the secondary cell, a number of candidate beams to replace the one or more beams, or both.

5. The method of claim 1, wherein the beam failure recovery response comprises a physical downlink control channel message and indicates of a set of candidate beams to replace the one or more beams associated with the beam failure event.

6. The method of claim 1, further comprising:
   transmitting the beam failure recovery request in the uplink data field of the physical uplink control channel message based at least in part on a payload size of the beam failure recovery request.

7. The method of claim 1, wherein the uplink data field is configured based at least in part on a format of the physical uplink control channel message.

8. A method for wireless communications at a network device associated with a primary cell, comprising:
   receiving, from a user equipment (UE), a beam failure recovery request for one or more beams associated with a secondary cell of the UE, wherein the beam failure recovery request is formatted in an uplink data field of a physical uplink control channel message that is configured to convey uplink payload data, the physical uplink control channel message comprising one or more additional fields configured to convey uplink control information different from the uplink payload data, and wherein an occasion for receiving the physical uplink control channel message occurs before an occasion for receiving a link recovery request associated with one or more beams; and
   transmitting a beam failure recovery response based at least in part on receiving the beam failure recovery request.

9. The method of claim 8, further comprising:
   configuring a first uplink resource for the UE to transmit the physical uplink control channel message and a second uplink resource for the UE to transmit the link recovery request, wherein the first uplink resource is different from the second uplink resource.

10. The method of claim 8, wherein the beam failure recovery request comprises a medium access control-control element conveying beam failure information associated with the one or more beams on the secondary cell.

11. The method of claim 10, wherein the beam failure information comprises an index of the secondary cell, a number of candidate beams to replace the one or more beams, or both.

12. The method of claim 8, further comprising:
   identifying one or more candidate beams to replace the one or more beams indicated in the beam failure recovery request;
   selecting a set of the one or more candidate beams based at least in part on a plurality of beam metrics identified determined for the one or more candidate beams; and
   transmitting the beam failure recovery response comprising the set of the one or more candidate beams to replace the one or more beams.

13. The method of claim 12, further comprising:
   performing one or more measurements on the one or more candidate beams associated with the secondary cell based at least in part on the beam failure recovery request.

14. The method of claim 8, further comprising:
   receiving the beam failure recovery request in the uplink data field of the physical uplink control channel message based at least in part on a payload size of the beam failure recovery request.

15. The method of claim 8, wherein the uplink data field is received in accordance with a format of the physical uplink control channel message.

16. An apparatus for wireless communications at a user equipment (UE), comprising:
   a processor;
   memory coupled with the processor; and
   instructions stored in the memory and executable by the processor to cause the apparatus to:
   identify a beam failure event of one or more beams associated with a secondary cell of the UE;
   transmit, on a primary cell of the UE, a beam failure recovery request in an uplink data field of a physical uplink control channel message, the physical uplink control channel message comprising one or more additional fields configured to convey uplink control information, wherein the uplink data field is configured to convey uplink payload data different from the uplink control information, and wherein an occasion for transmitting the physical uplink control channel message occurs before an occasion for transmitting a link recovery request associated with the beam failure event; and receive, on the primary cell, a beam failure recovery response based at least in part on transmitting the beam failure recovery request.

17. The apparatus of claim 16, wherein the occasion for transmitting the physical uplink control channel message is associated with a first uplink resource and the occasion for transmitting the link recovery request is associated with a second uplink resource different from the first uplink resource.

18. The apparatus of claim 16, wherein the beam failure recovery request comprises a medium access control-control element conveying beam failure information associated with the one or more beams on the secondary cell.

19. The apparatus of claim 18, wherein the beam failure information comprises an index of the secondary cell, a number of candidate beams to replace the one or more beams, or both.

20. The apparatus of claim 16, wherein the beam failure recovery response comprises a physical downlink control channel message and indicates of a set of candidate beams to replace the one or more beams associated with the beam failure event.

21. The apparatus of claim 16, wherein the instructions are further executable by the processor to cause the apparatus to:
transmit the beam failure recovery request in the uplink data field of the physical uplink control channel message based at least in part on a payload size of the beam failure recovery request.

22. The apparatus of claim 16, wherein the uplink data field is configured based at least in part on a format of the physical uplink control channel message.

23. An apparatus for wireless communications at a network device associated with a primary cell, comprising:
a processor;
memory coupled with the processor; and
instructions stored in the memory and executable by the processor to cause the apparatus to:
receive, from a user equipment (UE), a beam failure recovery request for one or more beams associated with a secondary cell of the UE, wherein the beam failure recovery request is formatted in an uplink data field of a physical uplink control channel message that is configured to convey uplink payload data, the physical uplink control channel message comprising one or more additional fields configured to convey uplink control information different from the uplink payload data, and wherein an occasion for receiving the physical uplink control channel message occurs before an occasion for receiving a link recovery request associated with one or more beams; and transmit a beam failure recovery response based at least in part on receiving the beam failure recovery request.

24. The apparatus of claim 23, wherein the occasion for transmitting the physical uplink control channel message is associated with a first uplink resource and the occasion for transmitting the link recovery request is associated with a second uplink resource different from the first uplink resource.

25. The apparatus of claim 23, wherein the beam failure recovery request comprises a medium access control-control element conveying beam failure information associated with the one or more beams on the secondary cell.

26. The apparatus of claim 25, wherein the beam failure information comprises an index of the secondary cell, a number of candidate beams to replace the one or more beams, or both.

27. The apparatus of claim 23, wherein the instructions are further executable by the processor to cause the apparatus to:
identify one or more candidate beams to replace the one or more beams indicated in the beam failure recovery request;
select a set of the one or more candidate beams based at least in part on a plurality of beam metrics identified determined for the one or more candidate beams; and
transmit the beam failure recovery response comprising the set of the one or more candidate beams to replace the one or more beams.

28. The apparatus of claim 27, wherein the instructions are further executable by the processor to cause the apparatus to:
perform one or more measurements on the one or more candidate beams associated with the secondary cell based at least in part on the beam failure recovery request.

29. The apparatus of claim 23, wherein the instructions are further executable by the processor to cause the apparatus to:
receive the beam failure recovery request in the uplink data field of the physical uplink control channel message based at least in part on a payload size of the beam failure recovery request.

30. The apparatus of claim 23, wherein the uplink data field is received in accordance with a format of the physical uplink control channel message.

\* \* \* \* \*